(12) United States Patent
Hyun et al.

(10) Patent No.: US 10,937,390 B2
(45) Date of Patent: Mar. 2, 2021

(54) CONTENT DISPLAY METHOD AND ELECTRONIC DEVICE FOR PERFORMING SAME

(71) Applicant: Samsung Electronics Co., Ltd., Suwon-si (KR)

(72) Inventors: Seung Jun Hyun, Seoul (KR); Seung Min Choi, Seongnam-si (KR); Min Sik Kim, Yongin-si (KR); Min Sung Lee, Suwon-si (KR); Song Hee Jung, Suwon-si (KR); Moo Young Kim, Seoul (KR); Ki Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/999,823

(22) PCT Filed: Feb. 8, 2017

(86) PCT No.: PCT/KR2017/001391
§ 371 (c)(1),
(2) Date: Aug. 20, 2018

(87) PCT Pub. No.: WO2017/142252
PCT Pub. Date: Aug. 24, 2017

(65) Prior Publication Data
US 2019/0244586 A1    Aug. 8, 2019

(30) Foreign Application Priority Data

Feb. 18, 2016    (KR) .................. 10-2016-0019395

(51) Int. Cl.
*G09G 5/14*    (2006.01)
*G06F 3/0488*    (2013.01)
*G06F 3/0481*    (2013.01)

(52) U.S. Cl.
CPC .............. *G09G 5/14* (2013.01); *G06F 3/0481* (2013.01); *G06F 3/0488* (2013.01);
(Continued)

(58) Field of Classification Search
CPC ...... G06F 3/0481; G06F 3/04886; G09G 5/14
See application file for complete search history.

(56) References Cited

U.S. PATENT DOCUMENTS 8,467,987 B1 * 6/2013 Davidson ............ G06F 11/3672
455/408
8,912,481 B2    12/2014 Jung et al.
(Continued)

FOREIGN PATENT DOCUMENTS

EP    2 830 293 A1    1/2015
KR    10-1344088 B1    12/2013
(Continued)

OTHER PUBLICATIONS

European Search Report dated Jan. 30, 2019, issued in European Patent Application No. 17753413.8.

*Primary Examiner* — Seth A Silverman
(74) *Attorney, Agent, or Firm* — Jefferson IP Law, LLP

(57) ABSTRACT

An electronic device according to an embodiment may comprise: a display having a content display area logically divided into a plurality of areas; and a processor functionally connected to the display. The processor may be configured to: display a first content in a first area; display, in a second area, a status window for providing an indication of a status of the electronic device or an application executed in the electronic device; move the first area in a predetermined direction in response to a predetermined event; and display a second content corresponding to the status in a third area on the basis of at least the movement of the first area. In (Continued)

addition, various embodiments recognized through the specification are also possible.

15 Claims, 18 Drawing Sheets

(52) U.S. Cl.
CPC ...... G06F 3/04883 (2013.01); G06F 3/04886 (2013.01); *G09G 2340/0464* (2013.01); *G09G 2340/145* (2013.01); *G09G 2354/00* (2013.01)

(56) References Cited

U.S. PATENT DOCUMENTS

| | | | |
|---|---|---|---|
| 9,154,606 B2 | 10/2015 | Tseng et al. | |
| 9,191,486 B2 | 11/2015 | Tseng et al. | |
| 9,471,145 B2 | 10/2016 | Langlois et al. | |
| 9,794,394 B2 | 10/2017 | Lee et al. | |
| 10,191,556 B2 | 1/2019 | Lazaridis et al. | |
| 2009/0249247 A1 | 10/2009 | Tseng et al. | |
| 2010/0095240 A1* | 4/2010 | Shiplacoff | G06F 3/04842 715/784 |
| 2012/0117507 A1 | 5/2012 | Tseng et al. | |
| 2012/0180001 A1 | 7/2012 | Griffin et al. | |
| 2013/0043928 A1 | 2/2013 | Jung et al. | |
| 2013/0063383 A1 | 3/2013 | Anderssonreimer et al. | |
| 2013/0141371 A1 | 6/2013 | Hallford et al. | |
| 2013/0159941 A1* | 6/2013 | Langlois | G06F 3/017 715/863 |
| 2014/0089833 A1* | 3/2014 | Hwang | G06F 3/04817 715/769 |
| 2015/0031417 A1* | 1/2015 | Lee | H04M 1/72519 455/566 |
| 2015/0079963 A1 | 3/2015 | Sun et al. | |
| 2015/0242065 A1 | 8/2015 | Ko et al. | |
| 2016/0080551 A1 | 3/2016 | Tseng et al. | |
| 2016/0309017 A1 | 10/2016 | Lee et al. | |
| 2018/0004408 A1 | 1/2018 | Bocking et al. | |

FOREIGN PATENT DOCUMENTS

| | | |
|---|---|---|
| KR | 10-2014-0039575 A | 4/2014 |
| KR | 10-2014-0044981 A | 4/2014 |
| KR | 10-2015-0043231 A | 4/2015 |
| KR | 10-2015-0099297 A | 8/2015 |
| WO | 2009/097555 A2 | 8/2009 |

* cited by examiner

CONTENT DISPLAY METHOD AND ELECTRONIC DEVICE FOR PERFORMING SAME

TECHNICAL FIELD

Embodiments disclosed in the present disclosure relate to a method of displaying content and an electronic device performing the same.

BACKGROUND ART

Recently, electronic devices, such as a smartphone, a wearable device, and the like, have been widely supplied since the spread of personal computers (PC). Various user interfaces are applied to the electronic device to interact with a user.

The electronic device may include, for example, a touch display serving as an input unit, which receives an input from the user, as well as a visual display unit. The user may intuitively easily make a user input through a graphic user interface (GUI) realized through the touch display.

DISCLOSURE

Technical Problem

Embodiments disclosed in the present disclosure, which relate to graphic user interfaces, may provide a method of displaying multiple pieces of content on a display depending on specified events and an electronic device performing the same.

Technical Solution

According to an embodiment disclosed in the present disclosure, an electronic device may include a display having a content display region logically divided into a plurality of regions, and a processor operatively connected with the display. The processor may be configured to display first content on a first region, to display, on a second region, a status window to provide an indication representing a state of the electronic device or a state of an application executed by the electronic device, to move the first region in a specified direction, in response to a specified event, and to display second content, which corresponds to the state, on a third region, based at least on moving the first region.

According to another embodiment, an electronic device may include a display having a content display region logically divided into a first region and a second region and a processor operatively connected with the display. The processor may be configured to display first content and second content on the first region and the second region, respectively, to move the first region in response to a specified event such that the first region covers at least a portion of the second region, and to display content associated with the first content or the second content on a region which is ensured as the first region is moved.

According to an embodiment disclosed in the present disclosure, a method of displaying content of an electronic device may include displaying first content on a first region, displaying, on a second region, a status window to provide an indication representing a state of the electronic device or a state of an application executed by the electronic device, moving the first region in a specified direction, in response to a specified event, and displaying second content, which corresponds to the state, on a third region based at least on moving the first region.

According to another embodiment, a method of displaying content of an electronic device may include displaying first content and second content a first region and a second region, respectively, moving the first region in response to a specified event such that the first region covers at least a portion of the second region, and displaying content associated with the first content or the second content on a region ensured as the first region is moved.

Advantageous Effects

According to embodiments disclosed in the present disclosure, main content, which is displayed on a display, may be output without change while an additional function may be significantly intuitively supported. Besides, a variety of effects directly or indirectly understood through the present disclosure may be provided.

MODE FOR INVENTION

Figure 1:
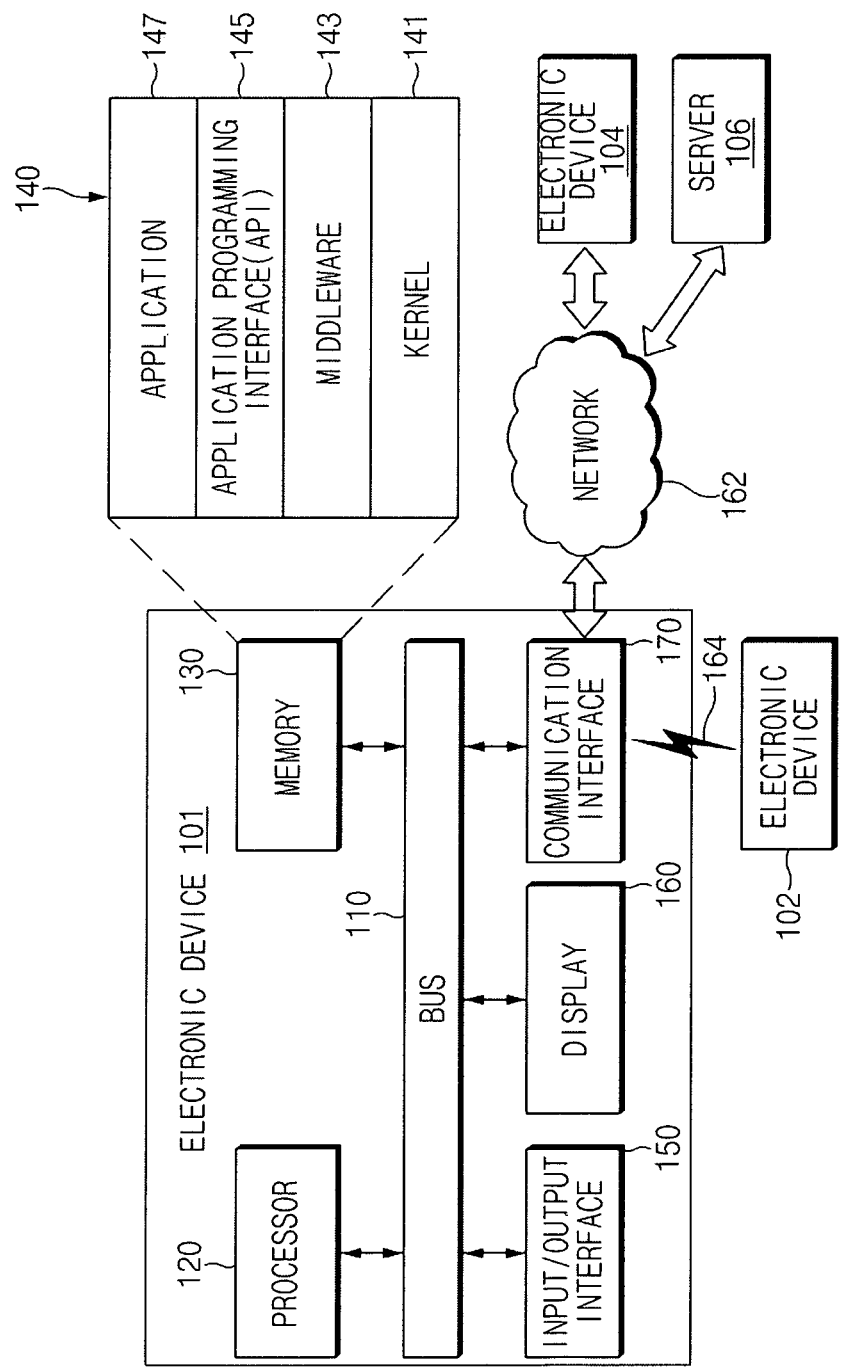
FIG. 1 illustrates an electronic device in a network environment according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component. In addition, the expressions "first" and "second" inserted in the legend of each drawing may be used for the clarity of accompanying drawings. The expressions "first and "second" inserted in one drawing does not exert any influence on the expressions "first" and "second" inserted in another drawing.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, 102, or 104, or a server 106 may be connected each other over a network 162 or a short range communication 164. The electronic device 101 may include a bus 110, a processor 120, a memory 130, an input/output interface 150, a display 160, and a communication circuit 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may be operatively connected with remaining components 110 to 170 of the electronic device and may perform an arithmetic operation or data processing associated with control and/or communication of at least one remaining component of the electronic device 101.

According to various embodiments, the processor 120 may perform various operations set forth in FIGS. 6A, 6B, 7A, and 7B. However, the operations of the processor 120 described with reference to FIGS. 6A, 6B, 7A, and 7B are provided for the illustrative purpose, but the present invention is not limited thereto. For example, even the operation of a "processor" described in another part of the present disclosure may be understood as the operation of the processor 120. In addition, at least some of operations described as the operations of the "electronic device" may be understood as operations of the processor 120.

The memory 130 may include a volatile and/or nonvolatile memory. For example, the memory 130 may store commands or data associated with at least one other component(s) of the electronic device 101. For example, the memory 130 may store instructions that, when executed, cause the processor 120 to perform the various operations set forth in FIGS. 6A, 6B, 7A, and 7B.

According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may display, for example, various pieces of content (e.g., a text, an image, a video, an icon, a symbol, or the like) for a user. A region of the display 160 enabling a user to visually recognize content may be referred to as a content display region or a screen. The content display region of the display 160 may be formed as a single region or may be logically divided into a plurality of regions. For example, the content display region of the display 160 may be divided into two regions. In this case, mutually different pieces of content may be displayed on a first region and a second region. For another example, a portion of content, which is displayed on the second region, may be continuously displayed on the first region (that is, the first region and the second region may be deemed as one region).

According to an embodiment, the display 160 may include a touch panel to receive a touch input of a user and/or a pressure sensor to detect pressure to the touch input. For example, the display 160 may receive a touch, gesture, proximity, or hovering input using an electronic pen or a part of a user's body (e.g., a finger).

The display 160 may include, for example, a liquid crystal display (LCD), a light-emitting diode (LED) display, an organic LED (OLED) display, a microelectromechanical systems (MEMS) display, or an electronic paper display. The more detailed configuration and functional operation of the display 160 will be described with reference to FIGS. 2 to 4.

For example, the communication circuit 170 may establish communication between the electronic device 101 and an external device (e.g., the first external electronic device 102, the second external electronic device 104, or the server 106). For example, the communication circuit 170 may be connected to the network 162 over wireless communication or wired communication to communicate with the external device (e.g., the second external electronic device 104 or the server 106).

The wireless communication may include cellular communication using at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, Bluetooth low energy (BLE), Zigbee, near field communication (NFC), magnetic secure transmission (MST), radio frequency (RF), body area network (BAN), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used.

The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
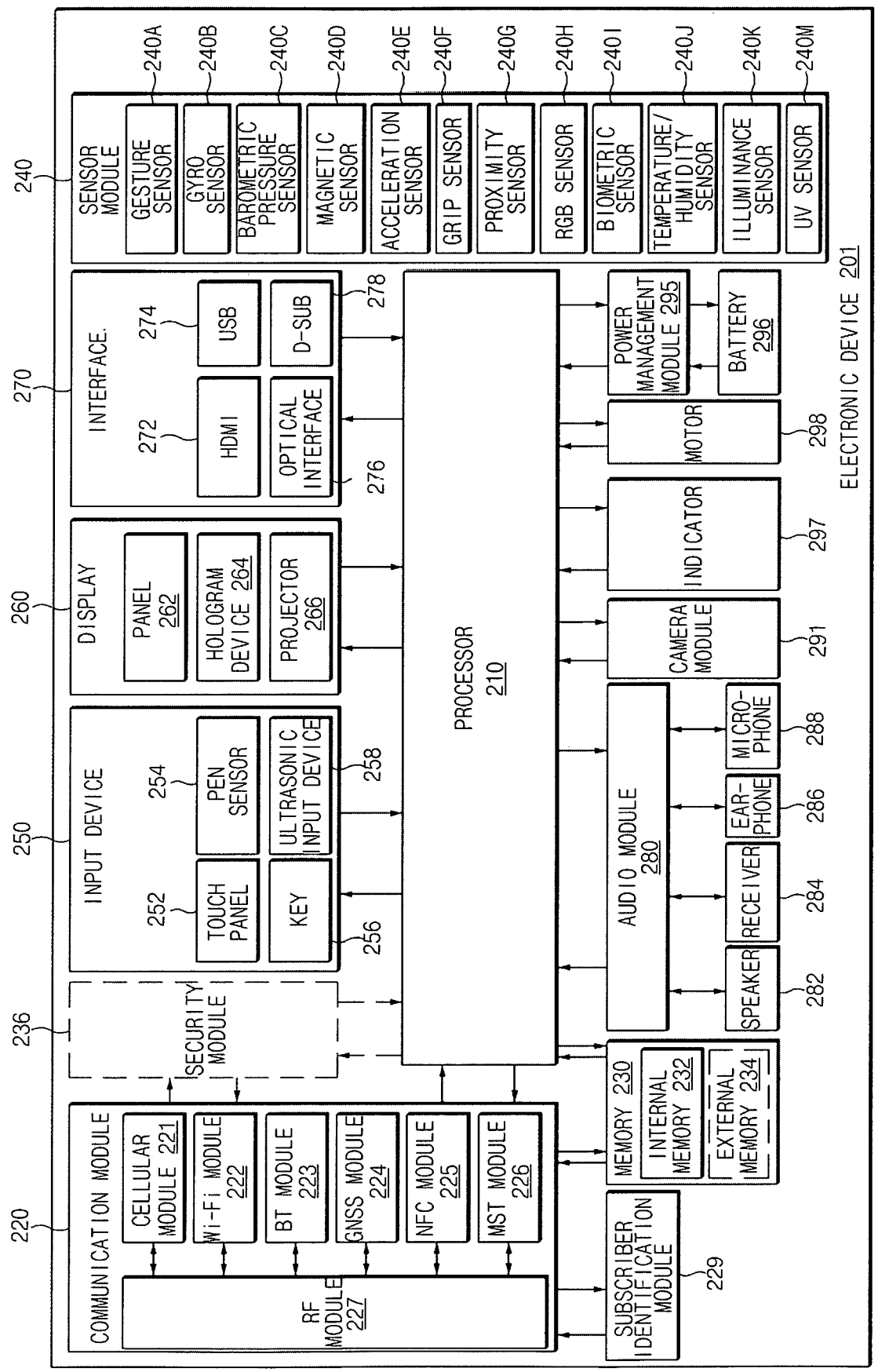
FIG. 2 illustrates a block diagram of the electronic device, according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a first display 260, a second display 265, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication circuit 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, and the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

A display (e.g., the display 160) may include a first display 260 and/or a second display 256. Although FIG. 2 illustrates that the electronic device 201 includes a plurality of displays 260 and 265, the display may include a single display according to various embodiments.

The first display 260 may include a first panel 262 and a first display driver integrated circuit (DDI) 264 to control the first panel. The second display 265 may include a second panel 266 and a second DDI 268 to control the second panel.

The first panel 262 and the second panel 266 may include a plurality of pixels. Each of the plurality of pixels may include subpixels expressing red, green, and blue (RGB) which constitute three primary colors of light. Each subpixel may include at least one transistor, and may adjust brightness and express color depending on the magnitude of a voltage (or a current) applied to the transistor.

The first DDI 264 and the second DDI 268 may include gate driver circuit parts and source driver circuit parts. The gate driver circuit part may not only perform an On/Off function, but control gates of the subpixels. The source driver circuit part may not only adjust the difference in output color between subpixels by adjusting image signals applied to the subpixels, but regulate the transistors of the subpixels, thereby providing a full screen of the display.

The first DDI 264 and the second DDI 268 may receive image data from the processor 210 and may display the image data on the first panel 262 and the second panel 266, respectively. For example, the first DDI 264 may operate to display a video or an image on the first panel 262 by providing first image data, which is supplied from the processor 210, to the first panel 262. The second DDI 268 may operate to display a video or an image on the second panel 266 by providing second image data (which is the same as or different from the first image data), which is supplied from the processor 210, to the second panel 266.

According to various embodiments, at least one of the first panel 262 or the second panel 266 may be implemented, for example, in a flat, transparent, flexible, or bendable form. At least one of the first panel 262 or the second panel 266 may include the touch panel 252 and/or the pen sensor 254 or may be implemented in one module. According to various embodiments or one embodiment, at least one of the first panel 262 or the second panel 266 may include a pressure sensor (or a force sensor) to measure the intensity of pressure of a touch of the user. The pressure sensor may be implemented integrally with the touch panel 252 or may be implemented in the form of at least one sensor separately from the touch panel 252.

According to various embodiments, the first display 260 and/or the second display 265 may employ various types of image output schemes. For example, the first display 260 and/or the second display 265 may include a hologram device to implement a stereoscopic image in the air by using interference of light, or a projector to display an image by projecting light onto a screen. For example, the screen may be positioned inside or outside the electronic device 201. According to an embodiment, the first display 260 and/or the second display 265 may further include a control circuit to control the hologram device or the projector.

Meanwhile, in an embodiment including a plurality of displays, the processor 210 may process data, an instruction, or the like (e.g., image data, image data stream, or the like) transmitted and received in various modules and a device included in the electronic device 201. For example, the processor 210 may decide to output content to at least one of the first display 260 or the second display 265. For example, the first display 260 may output data received from the communication module 220 under the control of the processor 210 and the second display 265 may output data received from the sensor module 240. For another example, the processor 210 may output content, which has been output on the first display 260, to the second display 265 by switching from the first display 260 to the second display 265, or may output the content, which has been output on the first display 260, to the second display 265 by expanding a display region to the second display 265. In contrast, the processor 210 may output content, which has been output on the second display 265, to the first display 260 by switching from the second display 265 to the first display 260, or may output the content, which has been output on the second display 265, to the first display 260 by expanding a display region to the first display 260.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication circuit 170 illustrated in FIG. 1. Additionally or alternatively, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
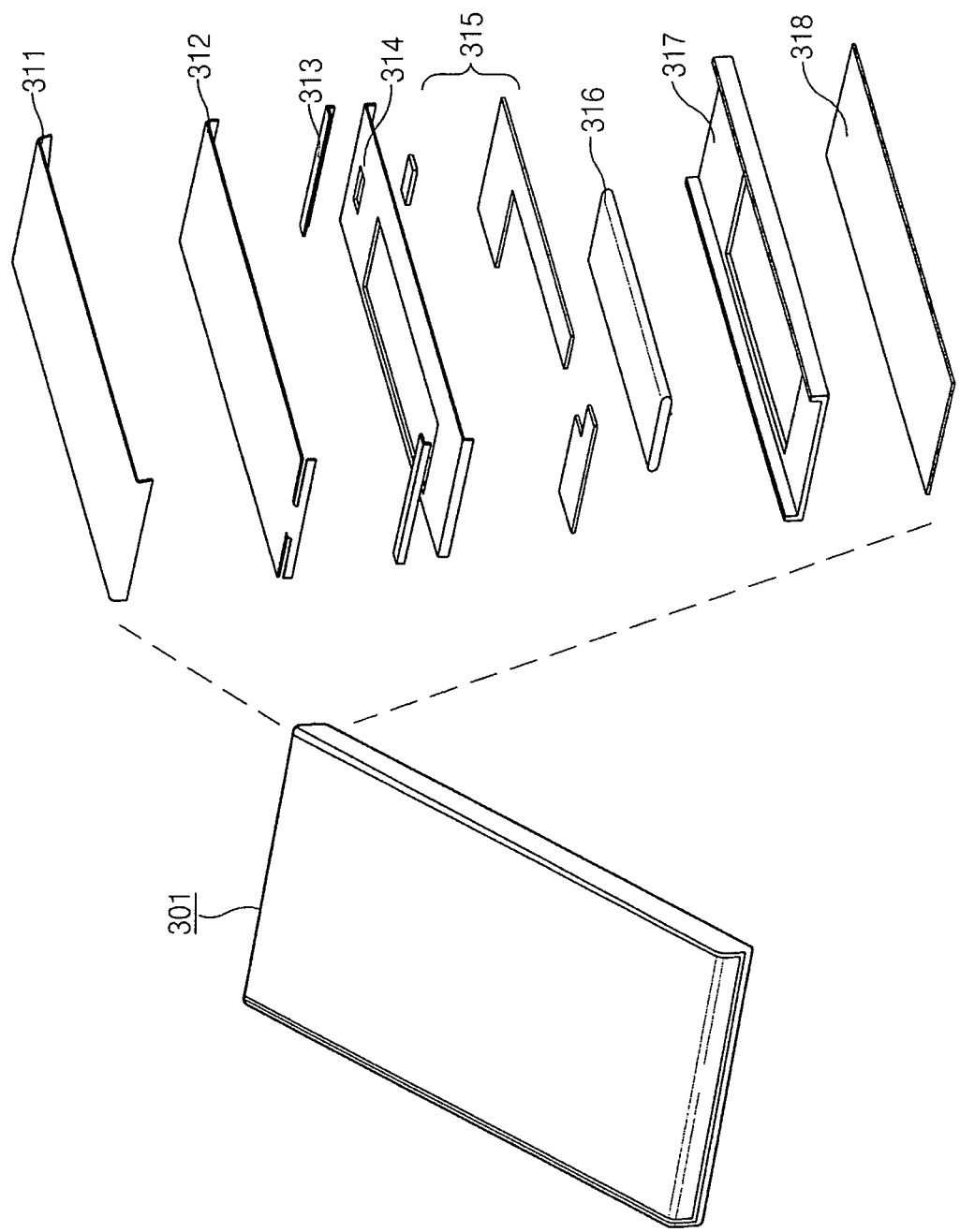
FIG. 3 illustrates internal components of an electronic device, according to an embodiment.

FIG. 3 illustrates internal components of an electronic device, according to an embodiment.

Referring to FIG. 3, according to an embodiment, an electronic device 301 may include a display 311, a metal sheet 312, a feeding circuit 313, a bracket 314, a circuit board 315, a battery 316, a housing 317, and a rear cover 318.

The display 311 may correspond to, for example, the first display 160 of FIG. 1, the first display 260 of FIG. 2, or the second display 265. The display 311 may constitute at least a portion of a front surface of the electronic device 301. The feature of the display 311 will be described later in detail with reference to FIG. 4.

The metal sheet 312 may be coupled to a lower portion of the display 311. The metal sheet 312 may suppress electromagnetic waves caused due to the operation of the display 311 such that the electromagnetic waves do not exert an influence on the internal components (e.g., the circuit board 315, or the like) of the electronic device 301. According to various embodiments, the metal sheet 312 may be referred to as a display ground.

The feeding circuit 313 may feed power to an antenna for wireless communication of the electronic device 301. According to an embodiment, the feeding circuit 313 may be connected with or equipped with components, such as an antenna radiator, an amplifier, an oscillator, a filter, or the like. According to various embodiments, the metal sheet 312 may be referred to as a feeding flexible printed circuit board (FPCB).

The bracket 314 may physically support various components embedded in the electronic device 301.

The circuit board 315 may include, for example, a main circuit board, a sub-circuit board, or a connector electrically connecting the main circuit board with the sub-circuit board. The circuit board 315 may be implemented with, for example, a printed circuit board (PCB), an FPCB, or the like. According to various embodiments, the circuit board 315 may be referred to as a main board.

The battery 316 may change chemical energy to electrical energy or change electrical energy to chemical energy. For example, the battery 316 may change chemical energy to electrical energy and may supply the electrical energy to various modules mounted in the display 311, the feeding circuit 313, and/or the circuit board 315. The battery 316 may convert electrical energy received from the outside into chemical energy and may store converted energy. The circuit board 315 may include a power management module to manage charging/discharging of the battery 316.

The housing 317 may include a plastic injection molded product and/or a metal material to protect various internal components of the electronic device 301 from external impact or dust. According to various embodiments, at least a portion of the housing 317 may include a metal material. For example, when a lateral housing of the housing 317 includes metal, a metal bezel may be implemented. According to various embodiments, at least a portion of a metal-implemented part of the housing 317 may be utilized as an antenna radiator.

The rear cover 318 may be coupled to a rear surface (an opposite surface to a surface on which the display 311 is disposed) of the housing 317. The rear cover 318 may include a tempered glass, a plastic injection-molded product and/or a metal material. According to an embodiment, the rear cover 318 may be implemented integrally with the housing 317 or may be implemented detachably from the housing 317 by a user.

Figure 4:
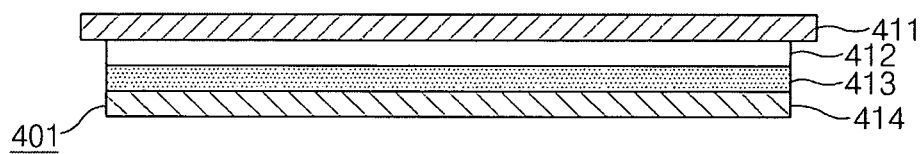
FIG. 4 illustrates a sectional view of a display, according to an embodiment.

FIG. 4 illustrates a sectional view of a display, according to an embodiment.

Referring to FIG. 4, according to various embodiments, a cross-sectional view of a display 401 to be mounted in an electronic device is illustrated. The display 401 may include a cover glass 411, a touch panel 412, a display panel 413, and a pressure sensor 414. For example, at least one of the cover glass 411, the touch panel 412, the display panel 413, and the pressure sensor 414 may be bonded to another component by an optical clean adhesive (OCA).

The cover glass 411 may transmit light generated by the display panel 413. For example, a user may perform a touch input (including an input using an electronic pen) to the cover glass 411 by using a part (e.g., a finger) of a human body. The cover glass 411 may be formed of, for example, tempered glass, reinforced plastic, a flexible polymer material, or the like and may protect the display 401 or the electronic device equipped with the display 401 from external impact.

The touch panel 412 may receive a touch input from a user. For example, when a part (e.g., a finger) of the user's body or a stylus (an example of an electronic pen) touches the touch panel 112, the change in the quantity of electronic charges is detected on the touch panel 412, so the touch input may be received (a capacitive touch panel). According to various embodiments, the touch panel 412 may employ at least one of a resistive scheme, an infrared scheme, or an ultrasonic scheme, in addition to the capacitive scheme. According to various embodiments, the touch panel 412 may be variously referred to as a touch screen panel (TSP), a touch sensor, or the like.

The display panel 413 may output content (e.g., a text, an image, a video, an icon, a widget, a symbol, or the like). For example, the display panel 114 may include a liquid crystal display (LCD) panel, a light-emitting diode (LED) display panel, an organic LED (OLED) display panel, a microelectromechanical systems (MEMS) display panel, or an electronic paper display.

The pressure sensor 414 (or "force sensor") may detect the pressure of a touch input of a user. For example, the pressure sensor 414 may detect the pressure value of a touch input (including an input using an electronic pen) received from a part (e.g., a finger) of the user's body.

For example, the pressure sensor 414 may detect the pressure of the touch input based on capacitance changed by the touch input of a user (so-called, a capacitive-type pressure sensor). For another example, the pressure sensor 414 may detect the pressure of the touch input by recognizing a contact area where a user performs the touch input. In addition, the pressure sensor 414 may detect the pressure of the touch input in various schemes. For example, the pressure sensor 414 may be implemented with a resistive-type pressure sensor or a piezo pressure sensor.

The stack structure of the display 401 illustrated in FIG. 4 is provided for the illustrative purpose and various modifications thereof are possible. For example, the touch panel 412 may be formed directly on a rear surface of the cover glass 411 (a so-called cover glass integrated touch panel), may be interposed between the cover glass 411 and the display panel 413 after being separately manufactured (a so-called add-on touch panel), may be formed directly on the display panel 413 (a so-called on-cell touch panel), or may be included inside the display panel 114 (a so-called in-cell touch panel).

For another example, the pressure sensor 414 may be arranged on the same layer as that of the touch panel 413 or may be included inside the display panel 413. In addition, although FIG. 4 illustrates that the pressure sensor 414 includes one layer, the pressure sensor 414 is implemented with a plurality of sensor modules and may be arranged on the rear surface of the display panel 413.

Figure 5:
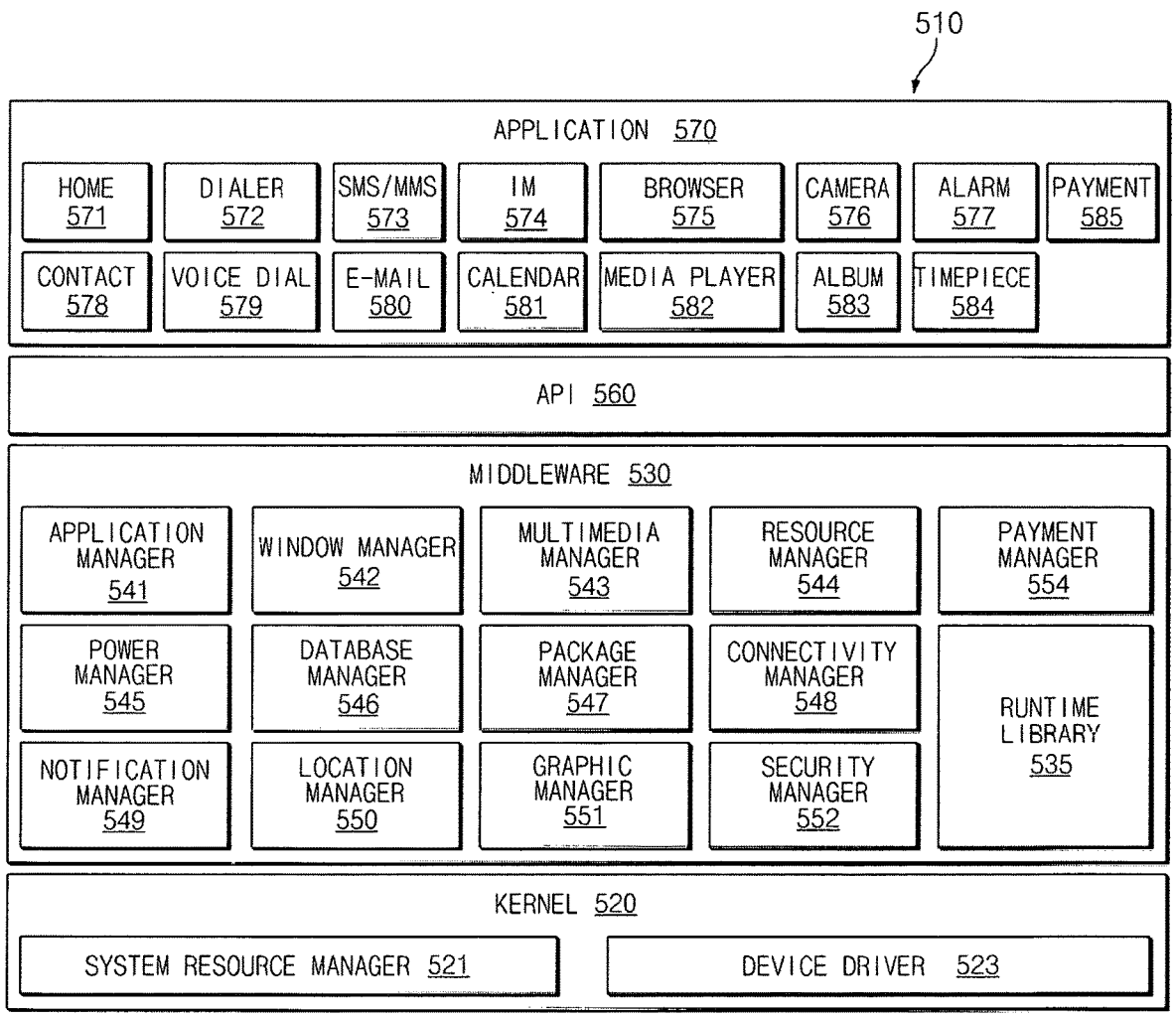
FIG. 5 illustrates a block diagram of a program module, according to various embodiments.

FIG. 5 illustrates a block diagram of a program module, according to various embodiments.

According to an embodiment, a program module 510 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™.

The program module 510 may include a kernel 520, a middleware 530, an application programming interface (API) 560, and/or an application 570. At least a portion of the program module 510 may be preloaded on an electronic device or may be downloadable from an external electronic device (e.g., the electronic device 102 or 104, the server 106, or the like).

The kernel 520 (e.g., the kernel 141) may include, for example, a system resource manager 521 or a device driver 523. The system resource manager 521 may perform control, allocation, or retrieval of system resources. According to an embodiment, the system resource manager 521 may include a process managing unit, a memory managing unit, or a file system managing unit. The device driver 523 may include, for example, a display driver, a camera driver, a Bluetooth driver, a shared memory driver, a USB driver, a keypad driver, a Wi-Fi driver, an audio driver, or an inter-process communication (IPC) driver. The display driver may control at least one or more display drivers (e.g., the first DDI (264) and the second DDI 268 of FIG. 2). For example, the display driver may perform functions for controlling the DDI as requested by the application 570.

The middleware 530 may provide, for example, a function that the application 570 needs in common, or may provide diverse functions to the application 570 through the API 560 to allow the application 570 to efficiently use limited system resources of the electronic device. According to an embodiment, the middleware 530 (e.g., the middleware 143) may include at least one of a runtime library 535, an application manager 541, a window manager 542, a multimedia manager 543, a resource manager 544, a power manager 545, a database manager 546, a package manager 547, a connectivity manager 548, a notification manager 549, a location manager 550, a graphic manager 551, a security manager 552, or a payment manager 554.

The runtime library 535 may include, for example, a library module that is used by a compiler to add a new function through a programming language while the application 570 is being executed. The runtime library 535 may perform input/output management, memory management, or capacities about arithmetic functions.

The application manager 541 may manage, for example, a life cycle of at least one application of the application 570. The window manager 542 may manage a graphic user interface (GUI) resource that is used in a screen. For example, when the electronic device includes a plurality of displays (e.g., the first display 260 and the second display 265 of FIG. 2), the window manager 542 may independently manage a screen of each display (e.g., an output ratio of the screen) depending on an operation of the application 570. The multimedia manager 543 may identify a format necessary for playing diverse media files, and may perform encoding or decoding of media files by using a codec suitable for the format. The resource manager 544 may manage resources such as a storage space, memory, or source code of at least one application of the application 570.

The power manager 545 may operate, for example, with a basic input/output system (BIOS) to manage a battery or power, and may provide power information for an operation of an electronic device. The database manager 546 may generate, search for, or modify database that is to be used in at least one application of the application 570. The package manager 547 may install or update an application that is distributed in the form of package file.

The connectivity manager 548 may manage, for example, wireless connection such as Wi-Fi or Bluetooth. The notification manager 549 may display or notify an event such as arrival message, appointment, or proximity notification in a mode that does not disturb a user. The location manager 550 may manage location information about an electronic device. The graphic manager 551 may manage a graphic effect that is provided to a user, or manage a user interface relevant thereto. The security manager 552 may provide a general security function necessary for system security, user authentication, or the like. According to an embodiment, in the case where an electronic device (e.g., the electronic device 101) includes a telephony function, the middleware 530 may further include a telephony manager for managing a voice or video call function of the electronic device.

The middleware 530 may include a middleware module that combines diverse functions of the above-described components. The middleware 530 may provide a module specialized to each OS kind to provide differentiated functions. Additionally, the middleware 530 may dynamically remove a part of the preexisting components or may add new components thereto.

The API 560 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 570 (e.g., the application program 147) may include, for example, one or more applications capable of providing functions for a home 571, a dialer 572, an SMS/MMS 573, an instant message (IM) 574, a browser 575, a camera 576, an alarm 577, a contact 578, a voice dial 579, an e-mail 580, a calendar 581, a media player 582, an album 583, a timepiece 584, and a payment 585 or for offering health care (e.g., measuring an exercise quantity, blood sugar, or the like) or environment information (e.g., information of barometric pressure, humidity, temperature, or the like).

According to an embodiment, the application 570 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device (e.g., the electronic device 102 or 104), an application running in the external electronic device, or a service (e.g., a call service, a message service, or the like) provided from the external electronic device.

According to an embodiment, the application 570 may include an application (e.g., a health care application of a mobile medical device) that is assigned in accordance with an attribute of an external electronic device (e.g., the electronic device 102 or 104). According to an embodiment, the application 570 may include an application that is received from an external electronic device (e.g., the electronic device 102 or 104, or the server 106). According to an embodiment, the application 570 may include a preloaded application or a third party application that is downloadable from a server. The names of components of the program module 510 according to the embodiment may be modifiable depending on kinds of operating systems.

According to various embodiments, at least a portion of the program module 510 may be implemented by software, firmware, hardware, or a combination of two or more thereof. At least a portion of the program module 510 may be implemented (e.g., executed), for example, by the processor (e.g., the processor 210). At least a portion of the program module 510 may include, for example, modules, programs, routines, sets of instructions, processes, or the like for performing one or more functions.

Figure 6A:
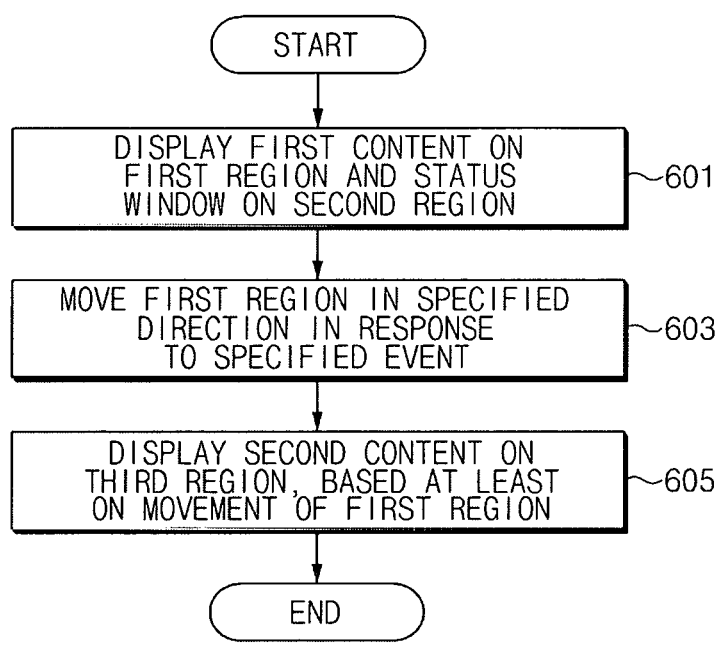
FIGS. 6A and 6B are flowcharts illustrating a method of displaying content, according to an embodiment.

FIG. 6A is a flowchart illustrating a method of displaying content, according to an embodiment.

Referring to FIG. 6A, according to an embodiment, the method of displaying content may include operation 601 to operation 605. Operation 601 to operation 605 may be performed by the electronic device 101 illustrated in FIG. 1. For example, each of operation 601 to operation 605 may be implemented through instructions performed (or executed) by a processor of the electronic device 101. The instructions may be, for example, stored in the memory 130 of the electronic device 101. In the following description made with reference to FIG. 6A, reference numerals of FIG. 1 will be used. In addition, in the following description made with reference to FIG. 6A, it is assumed that a content display region (or, screen) of the display 160 is logically divided into a first region and a second region (e.g., see FIG. 8).

In operation 601, the processor 120 may display first content on the first region (e.g., a region 801 of FIG. 8) of the display 160 and may display a status window on the second region (e.g., a region 802 of FIG. 8) of the display 160.

The status window may correspond to a UI object for providing an indication representing the electronic device 101 or the status of an application executed by the electronic device 101. According to various embodiments, the status window may be referred to as various names such as a status bar, a state indication bar, a state indication window, and the like.

In addition, for example, the first region and the second region may be adjacent to each other. In other words, at least a portion of a boundary surrounding the first region may be in contact with or adjacent to at least a portion of a boundary surrounding the second region. For example, the first region and the second region may be adjacent to each other while interposing a boundary line or a boundary region having a specified thickness (e.g., at least one pixel). According to various embodiments, the boundary line (or a boundary region) may be difficult to be identified by the naked eyes of the user. According to another embodiment, a specified graphic effect may be applied to the boundary region or a specified image may be output to the boundary region.

In operation 603, the processor 120 may move the first region (e.g., region 801 of FIG. 8) in a specified direction in response to a specified event.

For example, the specified event may include a touch input (so called, "force touch") having a specified pressure value or more to the first region. For example, along with the movement of the force touch of the user, the processor 120 may move the first region.

For another example, the specified event may include a touch input to a specified user interface (UI) object (e.g., an icon, a symbol, a soft-key, or the like). For example, when a specified notification is received through the status window displayed on the second region, the processor 120 may display a specified UI object on the first region. When the touch input (e.g., a swipe, a touch move, or the like) to the specified UI object is received from the user, the processor 120 may move the first region along with the touch input.

For another example, the specified event may correspond to the reception of the notification. For example, when the specified notification is received through the status window displayed on the second region, the processor 120 may automatically move the first region.

According to an embodiment, the specified direction may correspond to a direction that the first region covers at least a portion of the second region. For example, when the second region is arranged in an upper side area of the display 160 and the first region is arranged in a lower side area of the display 160, the specified direction may correspond to an upward direction.

In addition, according to an embodiment, the processor 120 may maintain the shape of the first region when moving the first region. For example, the width and the aspect ratio of the first region may be maintained without change before the first region is moved, during the movement of the first region, and after the first region is moved. Further, the first content displayed on the first region and the functional operation corresponding to the first content may be maintained without change.

Figure 8:
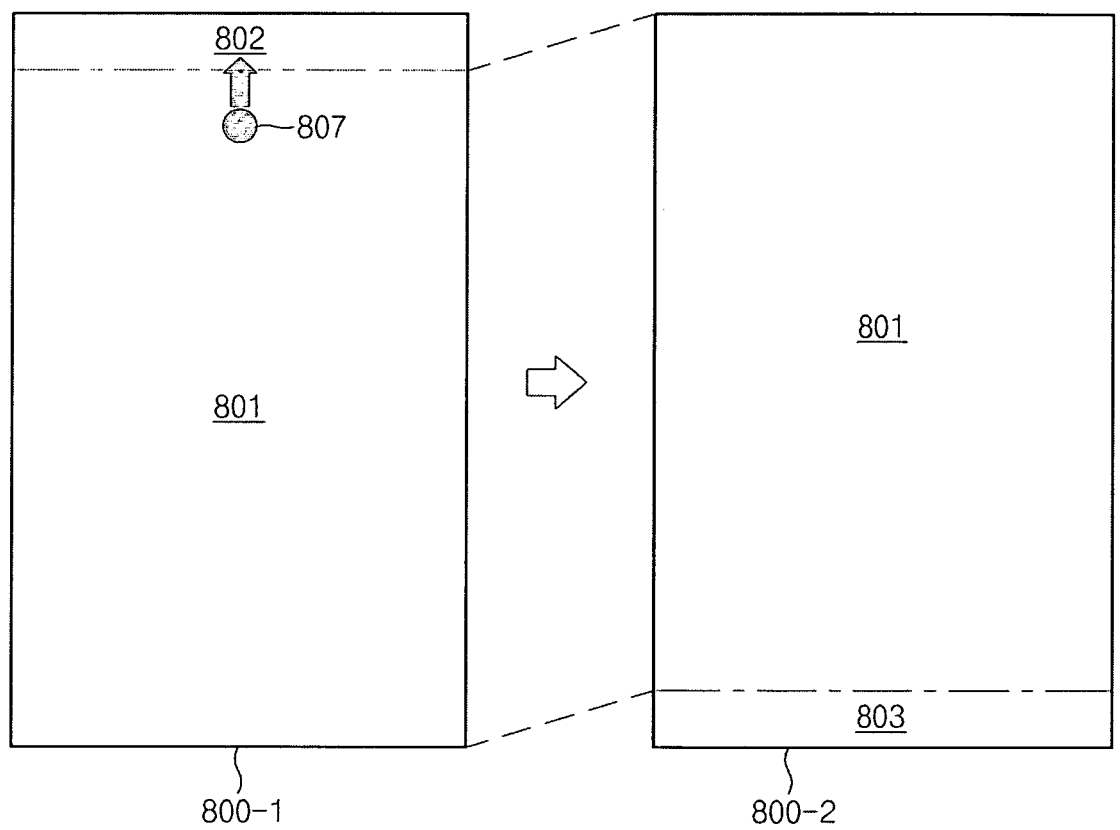
FIG. 8 illustrates a display of an electronic device, according to an embodiment.

In operation 605, the processor 120 may display second content on the third region (e.g., a region 803 of FIG. 8), based at least on the movement of the first region (e.g., the region 801 of FIG. 8).

The third region may correspond to, for example, the region which is ensured as the first region is moved. For example, the area of the third region may be equal to the occupation area of the second region before the first region is moved. In other words, the third region may correspond to a region obtained by excluding a region, which is occupied by the first region after the movement of the first region, from a region occupied by of the first region before the movement of the first region.

Accordingly, at least a portion of a boundary surrounding the third region may be in contact with or adjacent to at least a portion of a boundary surrounding the first region after the first region is moved. For example, a boundary line or a boundary region having a specific thickness may be interposed between the third region and the first region. The aspect ratio of the third region may be different from the aspect ratio of the first region.

Meanwhile, the second content may correspond to content associated with the status window displayed on the second region before the first region is moved. For example, the second content may include content (e.g., an image, a text, a symbol, an icon, a widget, or the combination thereof) associated with an indication representing the state of the electronic device 101 or an application executed on the electronic device 101.

Figure 6B:
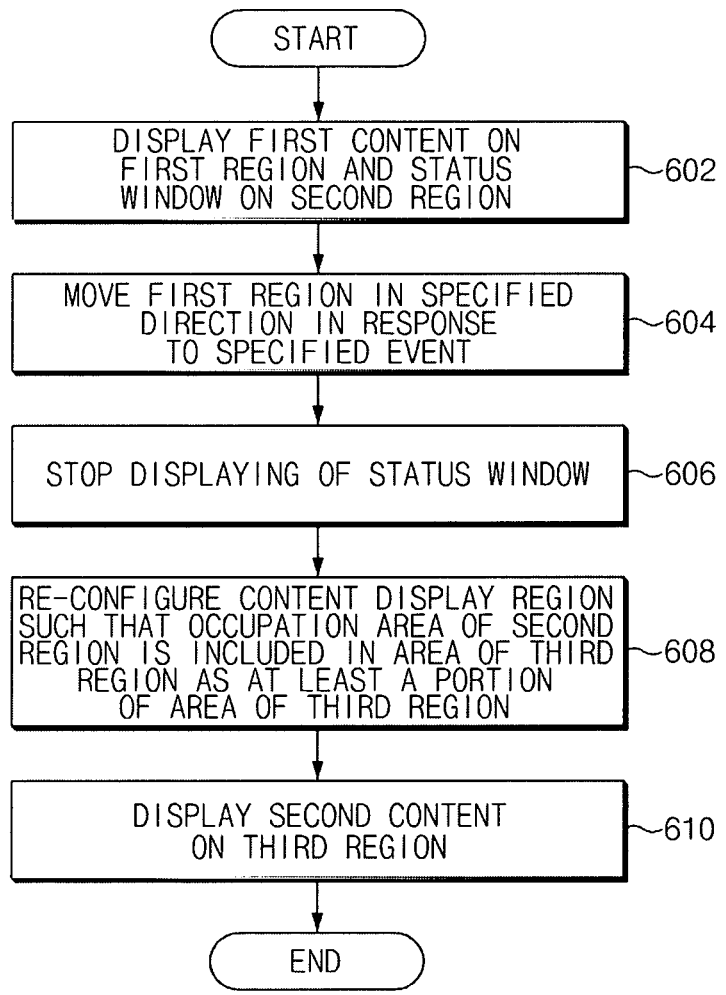

FIG. 6B is a flowchart illustrating a method of displaying content, according to another embodiment.

Referring to FIG. 6B, according to another embodiment, a method of providing content may include operation 602 to operation 610. Operation 602 to operation 610 may be performed by the electronic device 101 illustrated in FIG. 1. For example, each of operation 602 to operation 610 may be implemented through instructions performed (or executed) by a processor of the electronic device 101. The instructions may be, for example, stored in the memory 130 of a computer-readable recording medium or the electronic device 101. In the following description made with reference to FIG. 6B, the reference numerals of FIG. 1 will be employed and the details of parts overlapped with those of FIG. 6A will be omitted. In the following description made with reference to FIG. 6B, it is assumed that the content display region (or a screen) of the display 160 is logically divided into the first region, the second region, and the third region (different from the third region described with reference to FIG. 6A) (see FIG. 10).

Figure 10:
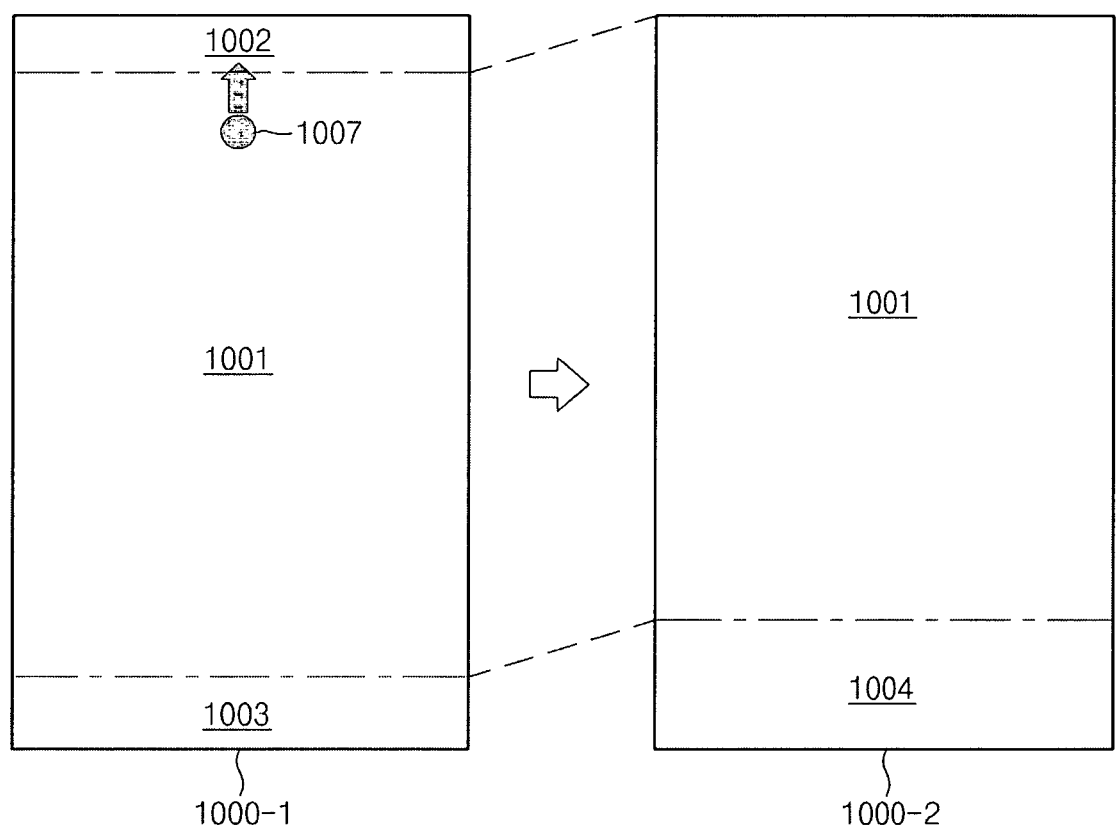
FIG. 10 illustrates a display of an electronic device, according to another embodiment.

In operation 602, the processor 120 may display first content on the first region (e.g., region 1001 of FIG. 10) of the display 160 and may display a status window on the second region (e.g., a region 1002 of FIG. 10). A portion of the first content expanded beyond the first region may be displayed on the third region (e.g., a region 1003 of FIG. 10) of the display 160, or separate third content may be output on the third region.

For example, the first region and the second region may be adjacent to each other. Further, the third region may be adjacent to the first region while being disposed opposite to the second region about the first region. In other words, at least a portion of a boundary surrounding the first region may be in contact with or adjacent to at least a portion of a boundary surrounding the second region. At least a portion of a boundary surrounding the third region may be in contact with or adjacent to at least a portion of a boundary surrounding the first region after the first region is moved.

In operation 604, the processor 120 may move the first region (e.g., the region 1001 of FIG. 10) in a specified direction in response to a specified event. For example, the specified direction may correspond to a direction that the first region covers at least a portion of the second region. In addition, the width and the aspect ratio of the first region may be maintained without change before the first region is moved, during the movement of the first region, and after the first region is moved.

In operation 606, the processor 120 may stop displaying the status window on the second region when the first region (e.g., the region 1001 of FIG. 10) moves to cover at least a portion of the second region (e.g., the region 1002 of FIG. 10). In other words, the second region may be completely covered by the first region.

In operation 608, the processor 120 may re-configure the content display region of the display 160 such that an occupation area of the second region (e.g., the region 1002 of FIG. 10) is included in an area of the third region (e.g., the region 1003 of FIG. 10) as at least a portion of the area of the third region. For example, after the first region is moved in operation 604, the processor 120 may stop displaying the status window in operation 606 and cover the second region by the first region. In operation 608, the processor 120 may allocate, to the third region, the occupation area (corresponding to the area of a region which is ensured as the first region is moved) of the second region.

In operation 610, the processor 120 may display the second content on the third region (e.g., a region 1004 of FIG. 10) expanded by the occupation area of the second region.

Figure 7A:
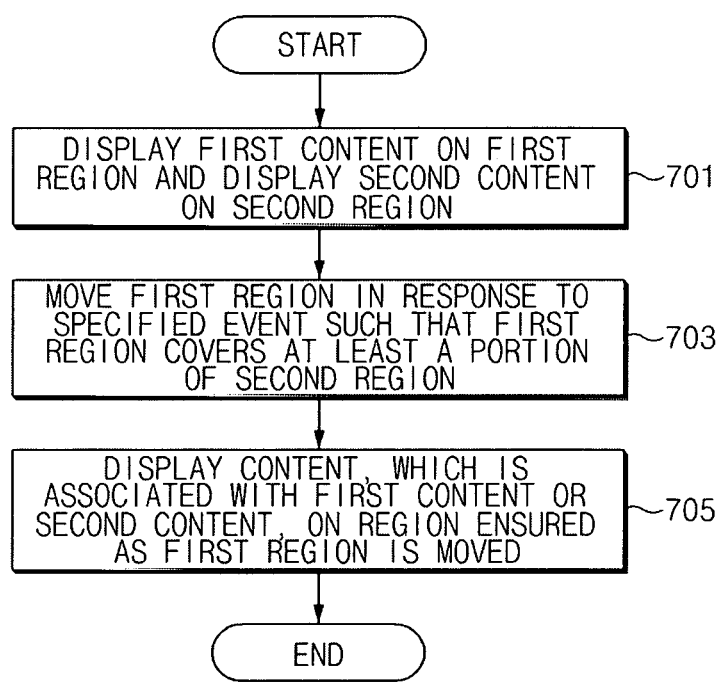
FIGS. 7A and 7B are flowcharts illustrating a method of displaying content, according to an embodiment.

FIG. 7A is a flowchart illustrating a method of displaying content, according to an embodiment.

Referring to FIG. 7A, according to an embodiment, the method of displaying the content may include operation 701 to operation 705. Operation 701 to operation 705 may be, for example, performed by the electronic device 101 illustrated in FIG. 1. For example, each of operation 701 to operation 705 may be implemented through instructions performed (or executed) by the processor 120 of the electronic device 101. The instructions may be, for example, stored in the memory 130 of the electronic device 101. In the following description made with reference to FIG. 7A, reference numerals of FIG. 1 will be used. In addition, in the following description made with reference to FIG. 7A, it is assumed that a content display region (screen) of the display 160 is logically divided into a first region and a second region (e.g., see FIG. 8).

In operation 701, the processor 120 may display first content on the first region (e.g., the region 801 of FIG. 8) and may display second content on the second region (e.g., the region 802 of FIG. 8). The second content may include a status window for providing an indication representing the state of the electronic device 101 or an application executed on the electronic device 101.

In operation 703, the processor 120 may move the first region (e.g., the region 801 of FIG. 8) in response to a specified event such that the first region (e.g., the region 801 of FIG. 8) at least partially covers the second region (e.g., the region 802 of FIG. 8).

For example, the processor 120 may handle, as the specified event, a touch input ('force touch') having specified pressure or more to the first region. For example, along with the movement of the force touch, the processor 120 may move the first region.

For another example, the processor 120 may handle, as the specified event, an input to a specified UI object (e.g., an icon, a symbol, a soft-key, or the like). For example, when a specified notification is received through the status window displayed on the second region, the processor 120 may display the specified UI object on the first region. When the input (e.g., a swipe, a touch move, or the like) to the specified UI object is received from the user, the processor 120 may move the first region along with the touch input.

For another example, the processor 120 may handle the reception of the notification as the specified event. For example, when the specified notification is received through the status window displayed on the second region, the processor 120 may automatically move the first region.

In addition, according to an embodiment, the processor 120 may maintain the shape of the first region when moving the first region. In addition, the width and the aspect ratio of the first region may be maintained without change before the first region is moved, during the movement of the first region, and after the first region is moved. Further, the first content displayed on the first region and the functional operation corresponding to the first content may be maintained without change.

In operation 705, the processor 120 may display content, which is associated with the first content displayed on the first region (e.g., the region 801 of FIG. 8) or the second content displayed on the second region (e.g., the region 802 of FIG. 8), on a region ensured as the first region (e.g., the region 801 of FIG. 8) is moved.

According to an embodiment, the area of the region, which is ensured as the first region is moved, may correspond to the area of the second region. In addition, the region, which is ensured as the first region is moved, may be disposed opposite to the second region about the first region. The region, which is ensured as the first region is moved, may be adjacent to the first region after the first region is moved.

According to an embodiment, the content, which is displayed on the region, which is ensured as the first region is moved, and associated with the first content, may include an image, a text, a symbol, an icon, a widget, or the combination thereof, which is associated with the first content. In addition, the content, which is associated with the second region and displayed on the region, which is ensured as the first region is moved, may include an image, a text, a symbol, an icon, a widget, or the combination thereof, which is associated with the change in the state of the electronic device or an application executed by the electronic device.

Figure 7B:
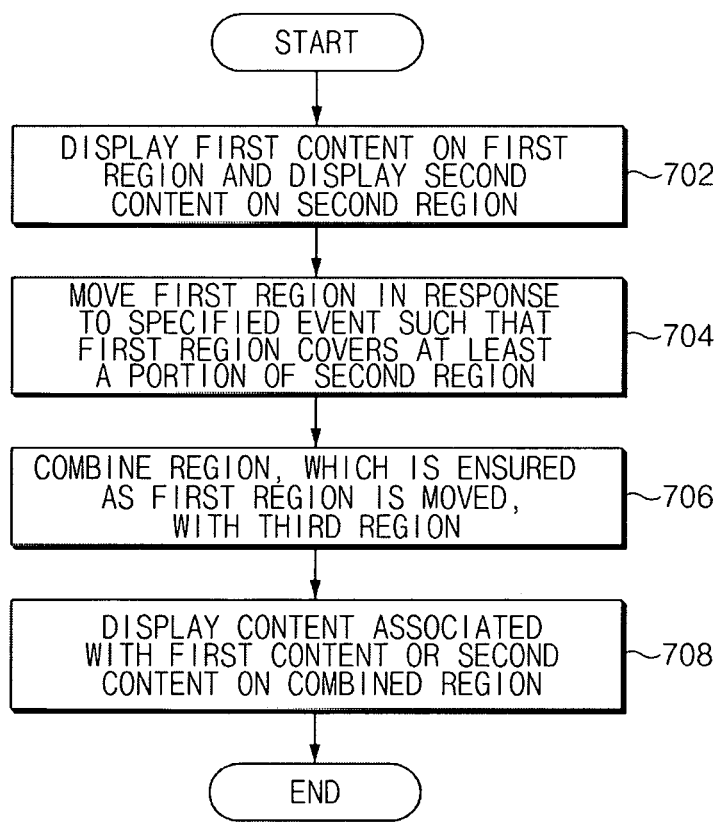

FIG. 7B is a flowchart illustrating a method of displaying content, according to another embodiment.

Referring to FIG. 7B, according to another embodiment, the method of displaying the content may include operation 702 to operation 708. Operation 702 to operation 708 may be, for example, performed by the electronic device 101 illustrated in FIG. 1. For example, each of operation 702 to operation 708 may be implemented through instructions performed (or executed) by a processor 120 of the electronic device 101. The instructions may be stored in, for example, a computer recording medium, or the memory 130 of the electronic device 101. In the following description made with reference to FIG. 7B, the reference numerals of FIG. 1 will be employed and the details of parts overlapped with those of FIG. 7A will be omitted. In the following description made with reference to FIG. 7B, it is assumed that the content display region (or a screen) of the display 160 is logically divided into a first region, a second region, and a third region (different from the third region described with reference to FIG. 6A) disposed opposite to the second region about the first region (see FIG. 10).

In operation 702, the processor 120 may display first content on the first region (e.g., region 1001 of FIG. 10) of the display 160 and may display a status window on the second region (e.g., the region 1002 of FIG. 10). The second content (different from the second content of FIGS. 6A and 6B) may include a status window. A portion of the first content displayed beyond the first region may be displayed on the third region (e.g., the region 1003 of FIG. 10) of the display 160, and separate third content may be output to the third region.

In operation 704, the processor 120 may move the first region (e.g., the region 1001 of FIG. 10) in response to a specified event such that the first region (e.g., the region 1001 of FIG. 10) at least partially covers the second region (e.g., the region 1002 of FIG. 10). In addition, the width and the aspect ratio of the first region may be maintained without change before the first region is moved, during the movement of the first region, and after the first region is moved.

In this case, since the first region covers the second region by the movement of the first region, displaying the status window may be stopped.

In operation 706, the processor 120 may combine a region, which is ensured as the first region is moved, with a third region (e.g., the region 1003 of FIG. 10), by reconfiguring a content display region of the display 160. The area of the third region may be expanded by an occupation area of the second region before the first region is moved (e.g., the region 1004 of FIG. 10).

In operation 708, the processor 120 may display content, which is associated with the first content displayed on the first region (e.g., the region 1001 of FIG. 10) or the second content displayed on the second region (e.g., the region 1002 of FIG. 10), instead of the third content on the expanded third region (e.g., the region 1004 of FIG. 10).

FIG. 8 illustrates a display of an electronic device, according to an embodiment.

Referring to FIG. 8, according to an embodiment, displays 800-1 and 800-2 of an electronic device are illustrated. For example, the display 800-1 may correspond to a display before a specified event is received, and the display 800-2 may correspond to a display after the specified event is received.

Referring to the display 800-1, a content display region (or, a screen) of the display 800-1 may be logically divided into a first region 801 and a second region 802. Although it is illustrated that the area of the first region 801 is set to be wider than the area of the second region 802 and the second region 802 is adjacent to the upper portion of the first region 801, the present invention is not limited thereto. For example, the area of the first region 801 may be set to be narrower than the area of the second region 802 and the second region 802 may be adjacent to the lower portion of the first region 801.

According to an embodiment, first content may be displayed on the first region 801 and second content may be displayed on the second region 802. For example, the first content displayed on the first region 801 may include various pieces of content produced as various applications are executed. In addition, the second content displayed on the second region 802 may include, for example, a status window providing an indication representing the state of the electronic device or the state of the application executed in the electronic device.

According to an embodiment, the electronic device may move the first region 801 in a specified direction 807, in response to a specified event. For example, referring to the display 800-2, the first region 801 may be moved to cover the second region 802. In this case, the electronic device 101 may maintain the shape (e.g., an area or an aspect ratio) of the first region 801 when the first region 801 is moved.

When the first region 801 is moved, the electronic device may display third content on a third region 803 which is ensured as the first region 801 is moved. The area of the third region 803 may be equal to the area of the second region 802 before the first region 801 is moved. In other words, the third region 803 may correspond to a region obtained by excluding a region, which is occupied by the first region 801 after the movement, from a region which is occupied by the first region 801 before the movement.

According to an embodiment, the third content may include an image, a text, a symbol, an icon, a widget, or the combination thereof associated with the first content or the second content. For example, when the second content displayed on the second region 802 includes a status window, the third content may include content (e.g., an image, a text, a symbol, an icon, a widget, or the combination thereof associated with the change in the state of the electronic device or the state of the application executed on the electronic device) associated with the status window.

Figure 9A:
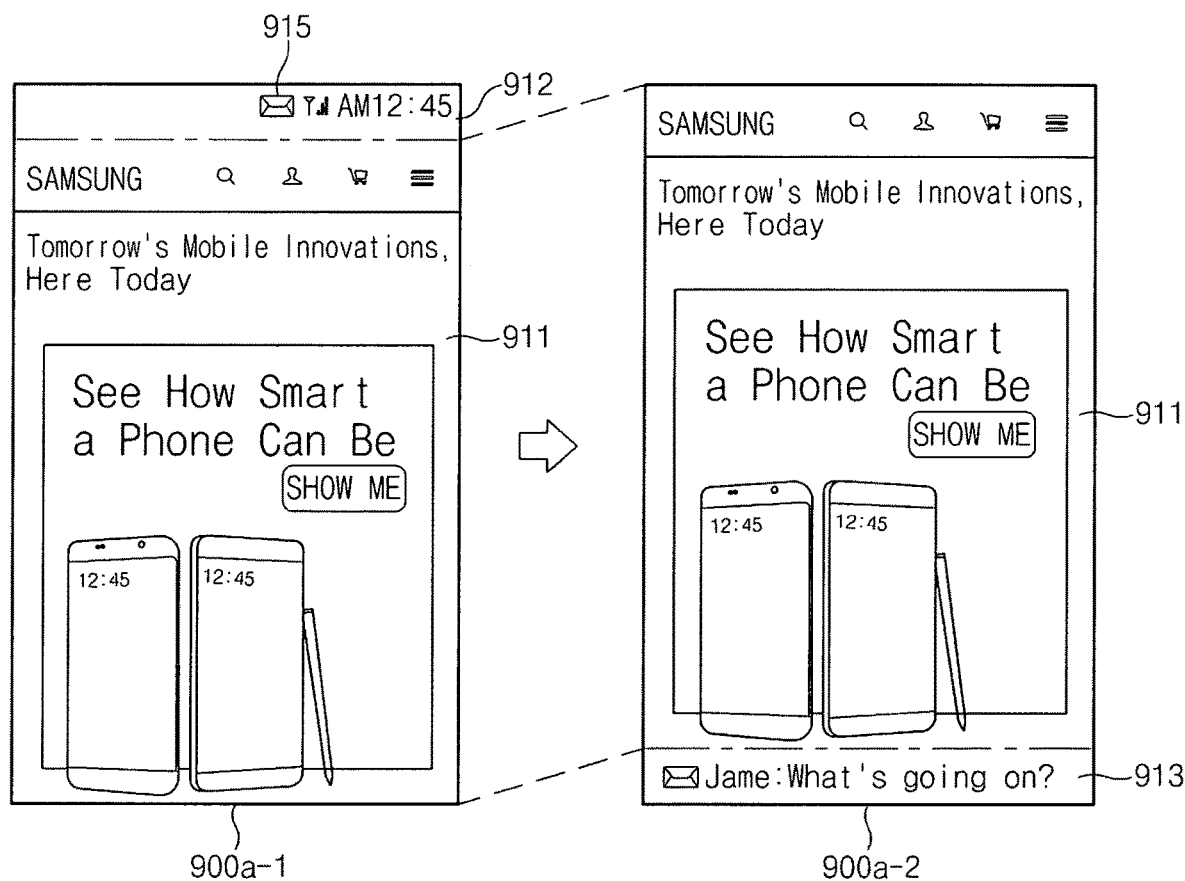
FIGS. 9A and 9B are views illustrating a method of displaying content, according to an embodiment.
Figure 9B:
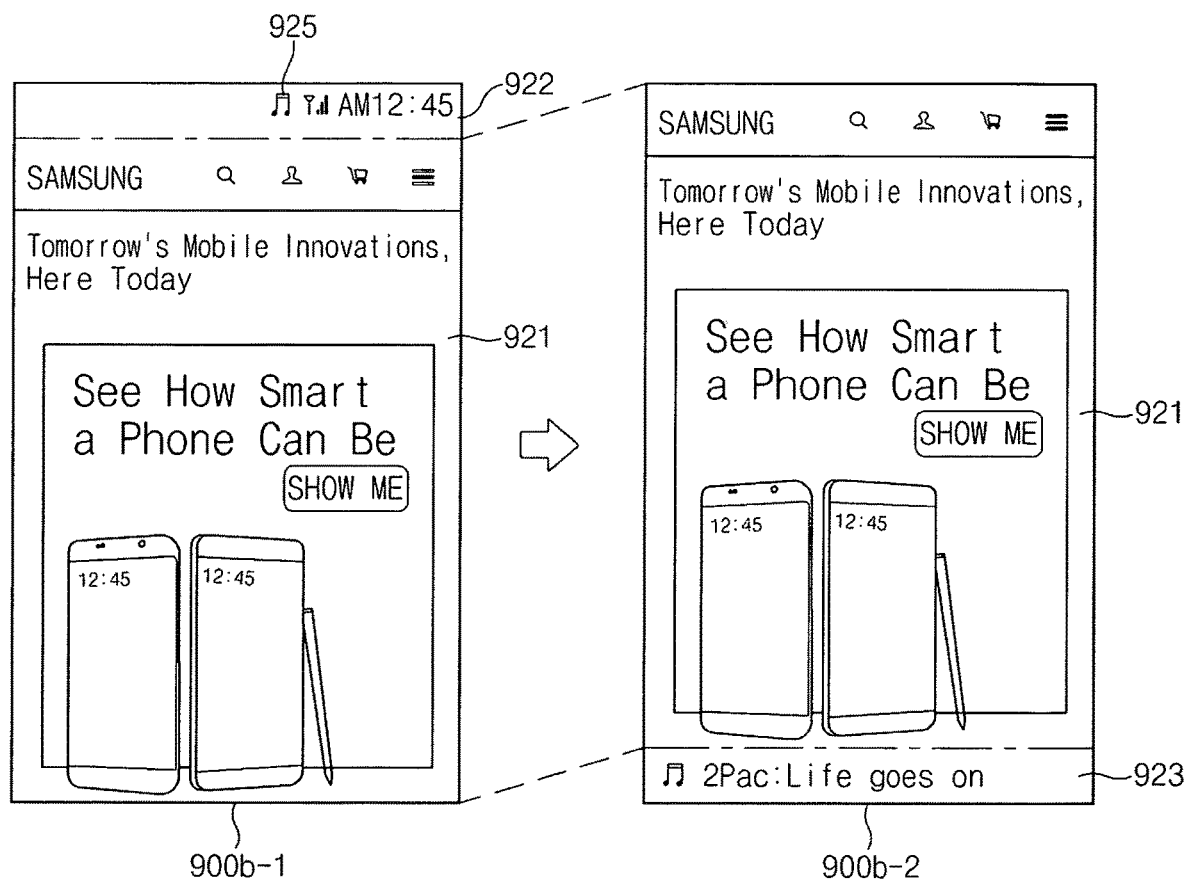

FIGS. 9A and 9B are views illustrating a method of displaying content, according to an embodiment.

Referring to FIG. 9A, according to an embodiment, displays 900a-1 and 900a-2 of an electronic device are illustrated. For example, the display 900a-1 may correspond to a display before a specified event is received, and the display 900a-2 may correspond to a display after the specified event is received Referring to the display 900a-1, a content display region (or, a screen) of the display 900a-1 may be logically divided into a first region 911 and a second region 912.

For example, first content may be displayed on the first region 911, and second content may be displayed on the second region 912. For example, the first content displayed on the first region 911 may include a web-page produced as a web-browser application is executed. In addition, the second content displayed on the second region 912 may include, for example, a status window providing an indication representing the state of the electronic device or the state of the application executed in the electronic device. For example, the status window may include a notification object 915 representing the reception of an SMS/MMS message.

According to an embodiment, the electronic device may move the first region 911 in a specified direction, in response to a specified event (e.g., a force touch input, the reception of an SMS/MMS message, or the like). For example, referring to the display 900a-2, the first region 911 may be moved to cover the second region 912. In this case, the electronic device may maintain the shape (e.g., an area or an aspect ratio) of the first region 911 and the first content included in the first region 911 when the first region 901 is moved.

When the first region 911 is moved, the electronic device may display third content on a third region 913 ensured as the first region 911 is moved. The area of the third region 913 may be equal to the area of the second region 912 before the first region 911 is moved.

For example, the third content may include content associated with the notification object 915 which has been displayed on the second region 912. For example, since the notification object 915 has been a notification object representing the reception of the SMS/MMS message, the third content may include a sender of the SMS/MMS message and the details thereof. According to various embodiments, the third content displayed on the third region may be output while being shifted from the right side to the left side. For example, the electronic device may display the sender of the SMS/MMS message and the details thereof while performing scrolling in one direction. Accordingly, an effect similar to a news ticker may be produced.

Referring to FIG. 9B, according to an embodiment, displays 900b-1 and 900b-2 of the electronic device are illustrated. For example, the display 900b-1 may correspond to a display before a specified event is received, and the display 900b-2 may correspond to a display after the specified event is received Referring to the display 900b-1, a content display region (or, a screen) of the display 900b-1 may be logically divided into a first region 921 and a second region 922.

For example, first content may be displayed on the first region 921, and second content may be displayed on the second region 922. For example, the first content displayed on the first region 921 may include a web-page produced as a web-browser application is executed. In addition, the second content displayed on the second region 922 may include, for example, a status window providing an indication representing the state of the electronic device or the state of the application executed in the electronic device. For example, an object 925 representing the playback of music may be included in the status window.

According to an embodiment, the electronic device may move the first region 921 in a specified direction, in response to a specified event (e.g., a force touch input, or the like). For example, referring to the display 900b-2, the first region 921 may be moved to cover the second region 922. In this case, the electronic device may maintain the shape (e.g., an area or an aspect ratio) of the first region 921 and the first content included in the first region 921 when the first region 921 is moved.

When the first region 921 is moved, the electronic device may display third content on a third region 923 which is ensured as the first region 921 is moved. The area of the third region 923 may be equal to the area occupied by the second region 922 before the first region 921 is moved.

For example, the third content may include content associated with an object 925 which has been displayed on the second region 922. For example, since the notification object 925 has been an object representing the playback of music, the third content may include information on the artist and the title of music in playback. According to various embodiments, the third content displayed on the third region may be output while being shifted from the right side to the left side. In other words, in addition to information on the artist and the title of the music in playback, the electronic device may display lyrics of the music in playback on the third region uniformly in one direction while performing scrolling.

FIG. 10 illustrates a display of an electronic device, according to an embodiment.

Referring to FIG. 10, according to an embodiment, displays 1000-1 and 1000-2 of the electronic device are illustrated. For example, the display 1000-1 may correspond to a display before a specified event is received, and the display 1000-2 may correspond to a display after the specified event is received Referring to the display 1000-1, a content display region (or, a screen) of the display 1000-1 may be logically divided into a first region 1002, a second region 1002, and a third region 1003. The division of the content display region of the display 1000-1 is provided for the illustrative purpose, but the present invention is not limited thereto. For example, the areas, the arrangement configuration, and the aspect ratios of the first region 1001, the second region 1002, and the third region 1003 may be variously set.

According to another embodiment, first content, second content, and third content may be displayed on the first region 1001, the second region 1002, and the third region 1003, respectively. For example, the first content displayed on the first region 1001 may include various pieces of content as various applications are executed. In addition, the second content displayed on the second region 1002 may include, for example, a status window providing an indication representing the state of the electronic device or the state of the application executed in the electronic device. In addition, the third content displayed on the third region 1003 may include a portion of first content displayed beyond the first region or additional content different from the first content and the second content.

According to an embodiment, the electronic device may move the first region 1001 in a specified direction 1007, in response to a specified event. For example, referring to the display 1000-2, the first region 1001 may be moved to cover the second region 1002. When the first region 1001 is moved to cover the second region 1002, the electronic device may stop displaying the status window displayed on the second region 1002. In other words, the second region 1002 may be completely covered by the first region 1001. In this case, the electronic device 101 may maintain the shape (e.g., an area or an aspect ratio) of the first region 1001 when the first region 1001 is moved.

When the first region 1001 is moved, the electronic device may re-configure a content display region of the display 1000-1 such that the region, which is ensured as the first region 1001 is moved, is included in the third region 1003 as at least a portion of the third region 1003. Through the re-configuration, a content display region of the display 1000-2 may be divided into the first region 1001 and a fourth region 1004 (the third region that is expanded).

For example, an occupation area of the second region 1002 is included in the area of the third region 1003 as at least a portion of the area of the third region 1003, thereby forming the fourth region 1004. The region, which is ensured as the first region is moved, may be combined with the third region 1003. The third region 1003 may be expanded by the occupation area of the second region 1002 through the combination.

Thereafter, the electronic device may display fourth content on the fourth region 803. According to an embodiment, the fourth content may include an image, a text, a symbol, an icon, a widget, or the combination thereof associated with the first content or the second content.

Figure 11A:
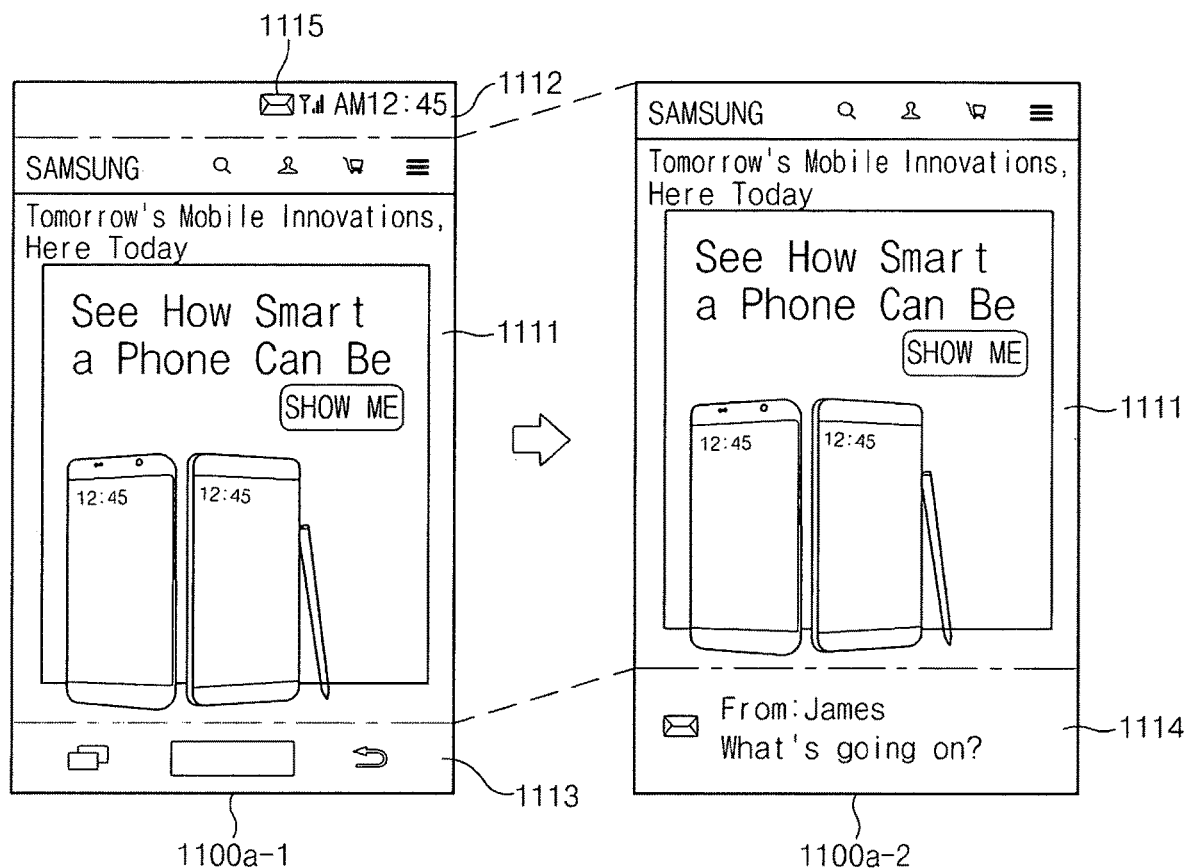
FIGS. 11A to 11D are views illustrating a method of displaying content, according to still another embodiment.
Figure 11B:
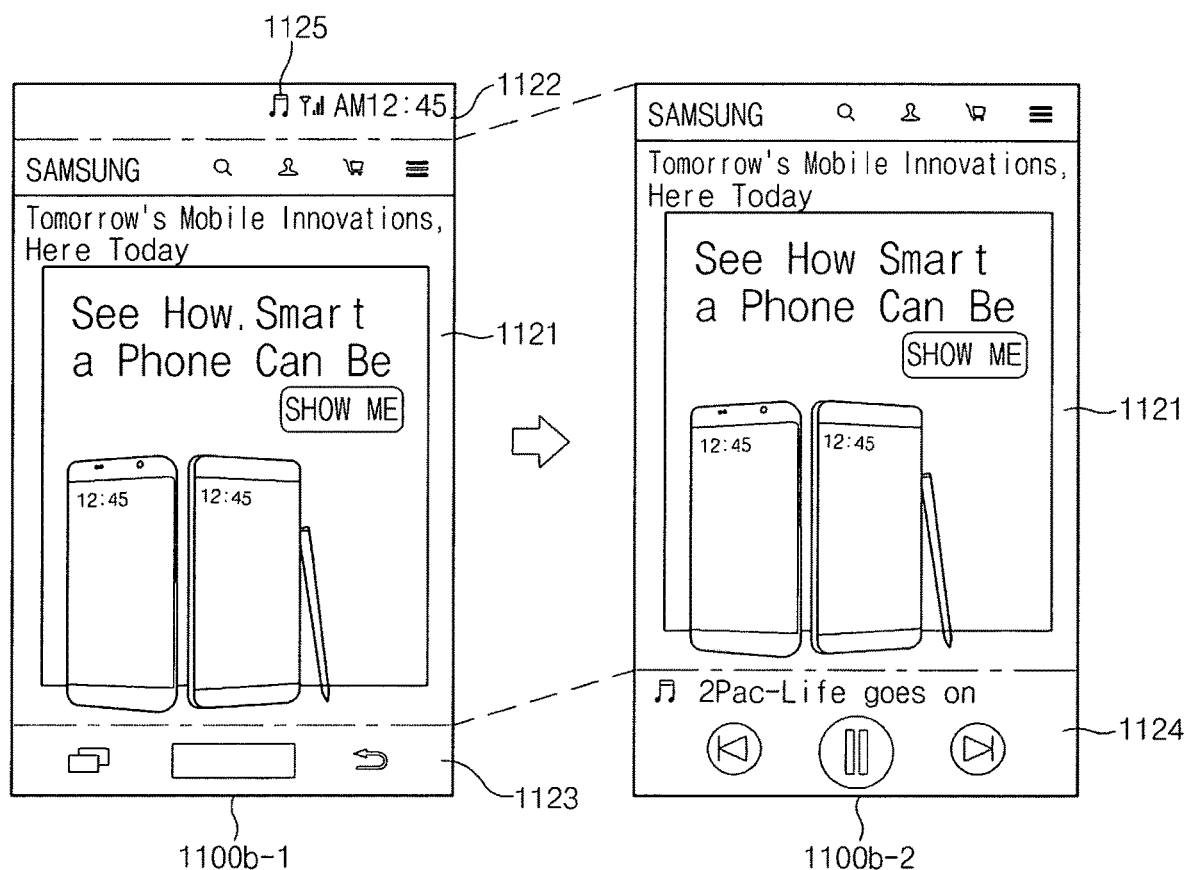

FIGS. 11A and 11B are views illustrating a method of displaying content, according to an embodiment.

Referring to FIG. 11A, according to an embodiment, displays 1100a-1 and 1100a-2 of an electronic device are illustrated. For example, the display 1100a-1 may correspond to a display before a specified event is received, and the display 1100a-2 may correspond to a display after the specified event is received Referring to the display 1100a-1, a content display region (or, a screen) of the display 1100a-1 may be logically divided into a first region 1111, a second region 1112, and a third region 1113. First content, second content, and third content may be displayed on the first region 1111, the second region 1112, and the third region 1113, respectively.

For example, the first content displayed on the first region 1111 may include a web-page produced as a web-browser application is executed. In addition, the second content displayed on the second region 1112 may include, for example, a status window providing an indication representing the state of the electronic device or the state of the application executed in the electronic device. For example, the status window may include a notification object 1115 representing the reception of an SMS/MMS message. In addition, the third content displayed on the third region 1113 may include a plurality of soft keys (an example of a UI object) for interacting with a user.

According to an embodiment, the electronic device may move the first region 1111 in a specified direction, in response to a specified event (e.g., a force touch input, the reception of an SMS/MMS message, or the like). For example, referring to the display 1100a-2, the first region 1111 may be moved to cover the second region 1112. When the first region 1111 is moved to cover the second region 1112, the electronic device may stop displaying the status window displayed on the second region 1112. In this case, the electronic device may maintain the shape (e.g., an area or an aspect ratio) of the first region 1111 and the first content included in the first region 1111 when the first region 1111 is moved.

When the first region 1111 is moved, the electronic device may re-configure a content display region of the display 1100*a*-1 such that the region, which is ensured as the first region 1111 is moved, is included in the third region 1113 as at least a portion of the third region 1113. Through the re-configuration, the content display region of the display 1100*a*-2 may be divided into the first region 1111 and a fourth region 1114 (the expanded third region).

For example, an occupation area of the second region 1112 is included in the area of the third region 1113 as at least a portion of the area of the third region 1113, thereby forming the fourth region 1114. The region ensured as the first region is moved may be combined with the third region 1113. The third region 1113 may be expanded by the occupation area of the second region 1112 through the combination.

Thereafter, the electronic device may display fourth content on the fourth region 1114 (the expanded third region). For example, the fourth content may include content associated with a notification object 1115 which has been displayed on the second region 1112. For example, since the notification object 1115 has been a notification object representing the reception of the SMS/MMS message, the fourth content may include a sender of the SMS/MMS message and the details thereof.

Referring to FIG. 11B, according to an embodiment, displays 1100*b*-1 and 1100*b*-2 of an electronic device are illustrated. For example, the display 1100*b*-1 may correspond to a display before a specified event is received, and the display 1100*b*-2 may correspond to a display after the specified event is received.

Referring to the display 1100*b*-1, a content display region (or, a screen) of the display 1100*b*-1 may be logically divided into a first region 1121, a second region 1122, and a third region 1123. First content, second content, and third content may be displayed on the first region 1121, the second region 1122, and the third region 1123, respectively.

For example, the first content displayed on the first region 1121 may include a web-page produced as a web-browser application is executed. In addition, the second content displayed on the second region 1122 may include, for example, a status window providing an indication representing the state of the electronic device or the state of the application executed in the electronic device. For example, an object 1125 representing the playback of music may be included in the status window. In addition, the third content displayed on the third region 1123 may include a plurality of soft keys (an example of a UI object) for interacting with a user.

According to an embodiment, the electronic device may move the first region 1121 in a specified direction, in response to a specified event (e.g., a force touch input, or the like). For example, referring to the display 1100*b*-2, the first region 1121 may be moved to cover the second region 1122. When the first region 1121 is moved to cover the second region 1122, the electronic device may stop displaying the status window displayed on the second region 1122. In this case, the electronic device may maintain the shape (e.g., an area or an aspect ratio) of the first region 1121 and the first content included in the first region 1121 when the first region 1121 is moved.

When the first region 1121 is moved, the electronic device may re-configure a content display region of the display 1100*b*-1 such that the region, which is ensured as the first region 1121 is moved, is included in the third region 1123 as at least a portion of the third region 1123. Through the re-configuration, the content display region of the display 1100*b*-2 may be divided into the first region 1121 and a fourth region 1124 (the expanded third region).

For example, an occupation area of the second region 1122 is included in the area of the third region 1123 as at least a portion of the area of the third region 1003, thereby forming the fourth region 1124. The region which is ensured as the first region is moved may be combined with the third region 1123. The third region 1123 may be expanded by the occupation area of the second region 1122 through the combination.

Thereafter, the electronic device may display fourth content on the fourth region 1124 (the expanded third region). For example, the fourth content may include content associated with the object 1125 which has been displayed on the second region 1122. For example, since the object 1125 has been an object representing the playback of music, the fourth content may include information on the artist and the title of music in playback and a widget (an example of a UI object) to control the playback of music.

Figure 11C:
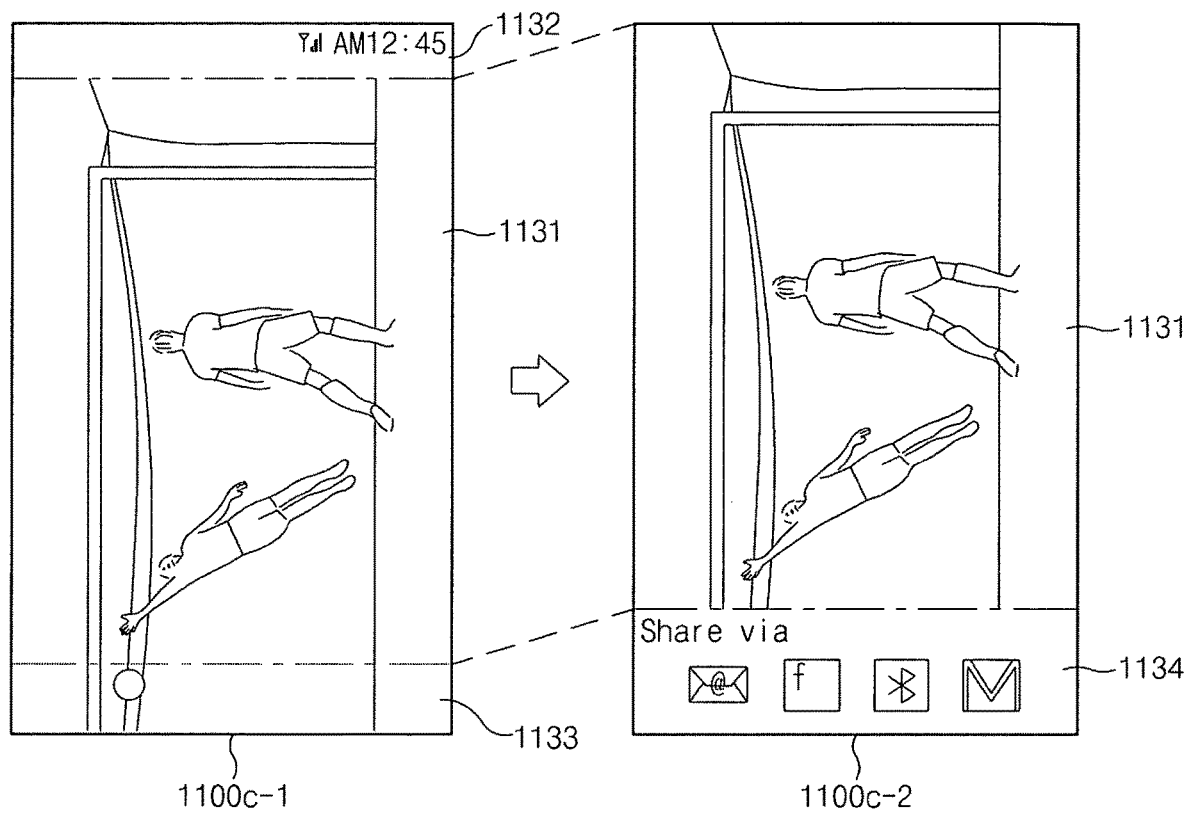

Referring to FIG. 11C, according to an embodiment, displays 1100*c*-1 and 1100*c*-2 of an electronic device are illustrated. For example, the display 1100*c*-1 may correspond to a display before a specified event is received, and the display 1100*c*-2 may correspond to a display after the specified event is received Referring to the display 1100*c*-1, a content display region (or, a screen) of the display 1100*c*-1 may be logically divided into a first region 1131, a second region 1132, and a third region 1133. First content, second content, and third content may be displayed on the first region 1131, the second region 1132, and the third region 1133, respectively.

For example, the first content displayed on the first region 1131 may include an image produced as an image-view application is executed. In addition, the second content displayed on the second region 1132 may include, for example, a status window providing an indication representing the state of the electronic device or the state of the application executed in the electronic device. In addition, the third content displayed on the third region 1133 may include a portion of the first content displayed beyond the first region 1131.

According to an embodiment, the electronic device may move the first region 1131 in a specified direction, in response to a specified event (e.g., a force touch input, or the like). For example, referring to the display 1100*c*-2, the first region 1131 may be moved to cover the second region 1132. When the first region 1131 is moved to cover the second region 1132, the electronic device may stop displaying the status window displayed on the second region 1132. In this case, the electronic device may maintain the shape (e.g., an area or an aspect ratio) of the first region 1131 and the first content included in the first region 1131 when the first region 1131 is moved.

When the first region 1131 is moved, the electronic device may re-configure a content display region of the display 1100*c*-1 such that the region, which is ensured as the first region 1131 is moved, is included in the third region 1133 as at least a portion of the third region 1133. Through the re-configuration, the content display region of the display 1100*c*-2 may be divided into the first region 1131 and a fourth region 1134 (the expanded third region).

For example, an occupation area of the second region 1132 is included in the area of the third region 1133 as at least a portion of the area of the third region 1133, thereby forming the fourth region 1134. The region, which is ensured as the first region is moved, may be combined with the third region 1133. The third region 1133 may be expanded by the occupation area of the second region 1132 through the combination.

Thereafter, the electronic device may display fourth content on the fourth region 1134. For example, the fourth content may include content associated with the first content which has been displayed on the first region 1131. For example, since the first content has been an image output through an image view application, the fourth content may include an icon of an application for sharing the image.

Figure 11D:
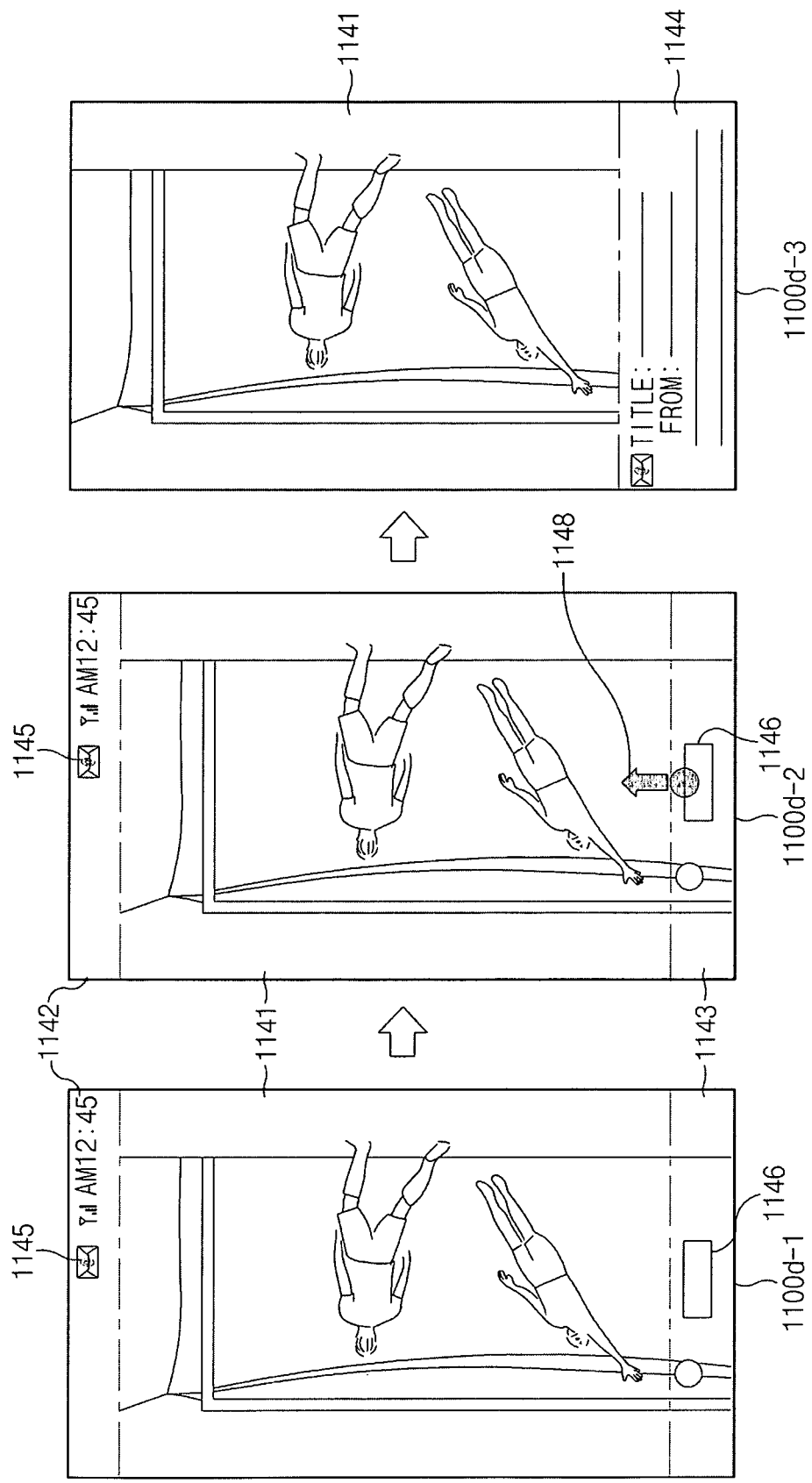

Referring to FIG. 11D, according to an embodiment, displays 1100*d*-1, 1100*d*-2, and 1100*d*-3 of the electronic device are illustrated.

Referring to the display 1100*d*-1, a content display region (or, a screen) of the display 1100*d*-1 may be logically divided into a first region 1141, a second region 1142, and a third region 1143. First content, second content, and third content may be displayed on the first region 1141, the second region 1142, and the third region 1143, respectively.

For example, the first content displayed on the first region 1141 may include an image produced as an image view application is executed. In addition, the second content displayed on the second region 1142 may include, for example, a status window providing an indication representing the state of the electronic device or the state of the application executed in the electronic device. The third content displayed on the third region 1143 may include a portion of the first content displayed beyond first region 1141.

According to an embodiment, when receiving an e-mail, the electronic device may display, on the status window, a notification object 1145 representing the reception of the e-mail. In addition, the electronic device may display a specified UI object 1146 on the third region 1143 (or the first region 1141) while displaying the notification object 1145. The specified UI object 1146, which has the form of a soft key, may not be displayed before the e-mail is received.

Referring to the display 1100*d*-1, the electronic device may move the first region 1141 in a specified direction 1148, in response to a specified event. For example, referring to the display 1100*d*-2, the electronic device may move the first region 1141 in the specified direction 1148 in response to a touch input (e.g., a touch move, a swipe, or the like) to the specified UI object 1146. When the first region 1141 is moved to cover the second region 1142, the electronic device may stop displaying the status window displayed on the second region 1142. In this case, the electronic device may maintain the shape (e.g., an area or an aspect ratio) of the first region 1141 and the first content included in the first region 1141 when the first region 1141 is moved.

When the first region 1141 is moved, the electronic device may re-configure a content display region of the display 1000-2 such that the region, which is ensured as the first region 1141 is moved, is included in the third region 1143 as at least a portion of the third region 1143. Through the re-configuration, the content display region of the display 1100*d*-3 may be divided into the first region 1141 and a fourth region 1144 (the expanded third region).

For example, an occupation area of the second region 1142 is included in the area of the third region 1143 as at least a portion of the area of the third region 1143, thereby forming the fourth region 1144. The region, which is ensured as the first region is moved, may be combined with the third region 1143. The third region 1143 may be expanded by the occupation area of the second region 1142 through the combination.

Thereafter, the electronic device may display fourth content on the fourth region 1144 (the expanded third region). For example, the fourth content may include content associated with the notification object 1145 which has been displayed on the second region 1142. For example, since the notification object 1145 has been a notification object representing the reception of an e-mail, the fourth content may include the title of the e-mail, the sender of the e-mail and/or the details of the e-mail.

Figure 12:
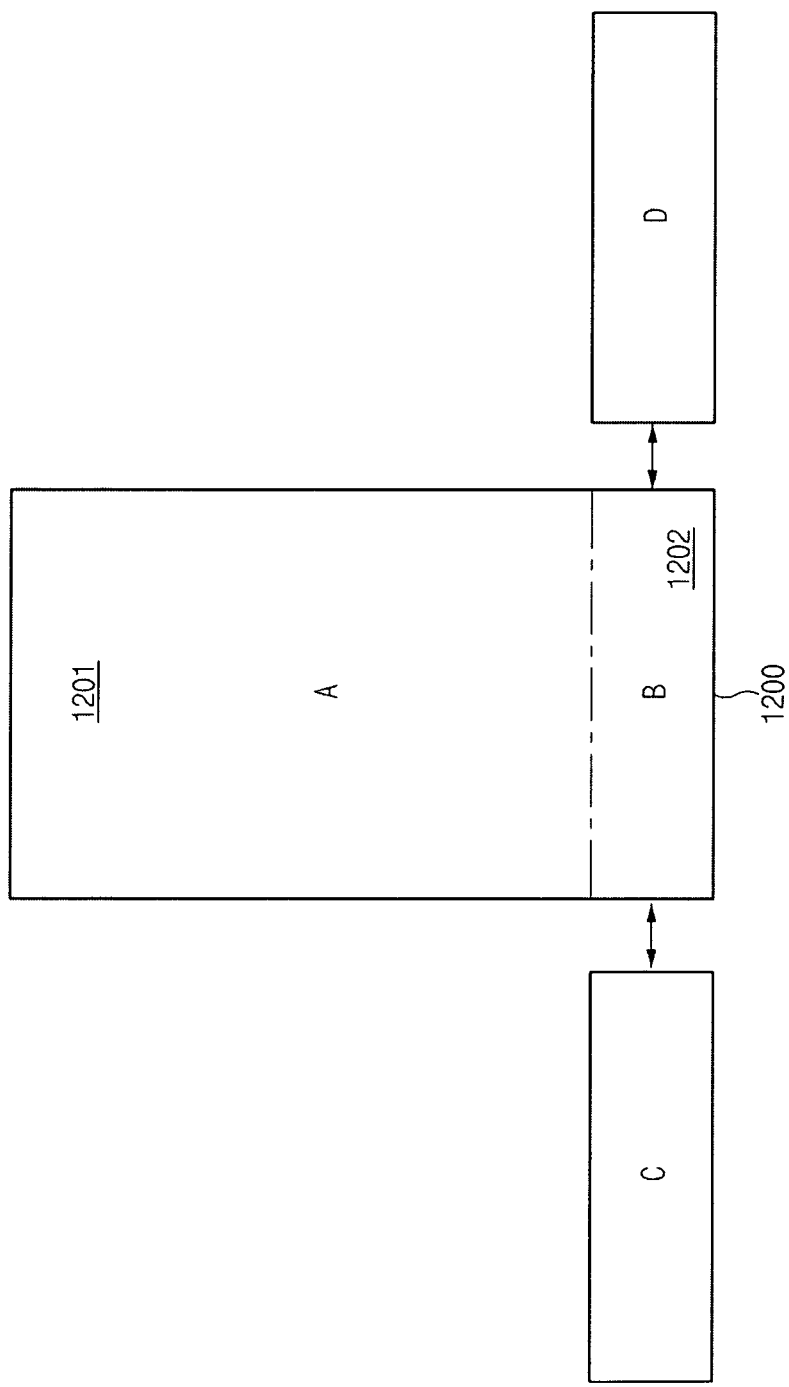
FIG. 12 illustrates a display of an electronic device, according to still another embodiment.

FIG. 12 illustrates a display of an electronic device, according to an embodiment.

Referring to FIG. 12, according to an embodiment, a display 1200 of the electronic device is illustrated. For example, the display 1200 may correspond to the display 803 of FIG. 8, the display 900*a*-2 of FIG. 9A, the display 900*b*-2 of FIG. 9B, the display 1000-2 of FIG. 10, the display 1100*a*-2 of FIG. 11A, the display 1100*b*-2 of FIG. 11B, the display 1100*c*-2 of FIG. 11C, or the display 1100*d*-3 of FIG. 11D.

A content display region (or, a screen) of the display 1200 may be logically divided into a first region 1201 and a second region 1202. Content A and content B may be displayed on the first region 1201 and the second region 1202, respectively. The division of the content display region of the display 1200 is provided for the illustrative purpose, but the present disclosure is not limited thereto. For example, the areas, the arrangement configuration, and the aspect ratios of the first region 1201, and the second region 1002 may be variously set.

According to an embodiment, the electronic device may display content C or content D in response to a user input (another example of a specified event) to the second region 1202. For example, the content C may be output instead of the content A when a user performs leftward-touch scrolling with respect to the second region 1202. In contrast, the content D may be output instead of the content A when the user performs rightward-touch scrolling with respect to the second region 1202.

For example, regarding the display 900*a*-2 of FIG. 9A, when the user performs touch scrolling leftward or rightward with respect to the region 913, another SMS/MMS message may be displayed. Regarding the display 900*b*-2 of FIG. 9B, when the user performs touch scrolling leftward or rightward with respect to the region 923, music in playback is switched to next music and information on the artist and the title of the next music may be displayed on the display 900*b*-2.

For another example, regarding the display 1100*a*-2 of FIG. 11A, when the user performs scrolling leftward or rightward with respect to the region 1114, another e-mail may be displayed. Regarding the display 1100*b*-2 of FIG. 11B, when the user performs scrolling with respect to the region 1124 leftward or rightward, a playlist may be displayed. Regarding the display 1100*c*-2 of FIG. 11C, when the user performs scrolling with respect to the region 1134 leftward or rightward, a UI object associated with a tool for editing an image displayed on the region 1131 may be output. For another example, regarding the display 1100*d*-3 of FIG. 11D, when the user performs scrolling with respect to the region 1144 leftward or rightward, another e-mail may be displayed.

According to various embodiments, the user may perform upward-touch scrolling with respect to the second region 1202. When the upward-touch scrolling is performed, the electronic device may display content for a full screen, which is associated with the content B displayed on the second region 1202, on the full content display region (that is, the region obtained by combining the first region 1201 and the second region 1202) of the display 1200.

Further, in contrast, the user may perform a downward-touch scrolling with respect to the first region 1201. When the downward-touch scrolling is performed, the electronic device may display content for a full screen, which is associated with the content A displayed on the first region 1201, on the whole content display region (that is, the region obtained by combining the first region 1201 and the second region 1202) of the display 1200.

According to various embodiments of the present disclosure, main content, which is displayed on a display, may be output without change while an additional function may be significantly intuitively supported.

As described above, according to an embodiment, an electronic device may include a display having a content display region logically divided into a plurality of regions, and a processor operatively connected with the display. The processor may be configured to display first content on a first region, to display, on a second region, a status window to provide an indication representing a state of the electronic device or a state of an application executed by the electronic device, to move the first region in a specified direction, in response to a specified event, and to display second content, which corresponds to the state, on a third region, at least based on moving the first region.

According to another embodiment, the processor may be configured to maintain an aspect ratio of the first region when moving the first region.

According to another embodiment, the processor may be configured to stop displaying the status window, when moving the first region such that the first region covers at least a portion of the second region, and to re-configure the content display region such that an occupation area of the second region is included in an area of the third region as at least a portion of the area of the third region.

According to another embodiment, at least a portion of a boundary surrounding the first region may be in contact with or adjacent to at least a portion of a boundary surrounding the second region.

According to another embodiment, at least a portion of a boundary surrounding the third region may be in contact with or adjacent to at least a portion of a boundary surrounding the first region.

According to another embodiment, an aspect ratio of the third region may be set to be different from an aspect ratio of the first region.

According to another embodiment, the display may include a touch panel to receive a touch input, and the specified event may include a touch input to a specified user interface (UI) object.

According to another embodiment, the display may include a touch panel to receive a touch input, and a pressure sensor to detect pressure of the touch input. The specified event may include a touch input having a specified pressure value or more to the first region.

According to another embodiment, the specified event may correspond to reception of a notification representing change in the state.

According to another embodiment, an electronic device may include a display having a content display region logically divided into a first region and a second region and a processor operatively connected with the display. The processor may be configured to display first content and second content on the first region and the second region, respectively, to move the first region in response to a specified event such that the first region covers at least a portion of the second region, and to display content associated with the first content or the second content on a region which is ensured as the first region is moved.

According to another embodiment, the processor may be configured to maintain an aspect ratio of the first region when moving the first region.

According to another embodiment, the region, which is ensured as the first region is moved, may have a size corresponding to a size of the second region.

According to another embodiment, the region, which is ensured as the first region is moved, is disposed opposite to the second region about the first region.

According to another embodiment, the second content may include a status window for providing an indication representing a state of the electronic device or a state of an application executed in the electronic device. The processor may be configured to, when specified notification is received through the status window, handle the reception of the specified notification as the specified event.

According to another embodiment, the processor may be configured to, when the specified notification is received through the status window, display a specified UI object on the first region and handle an input to the specified UI object as the specified event.

According to another embodiment, the display may further include a touch panel to receive a touch input and a pressure sensor to detect the pressure of the touch input. The processor may be configured to handle a touch input having a specified pressure or more to the first region as the specified event.

According to another embodiment, the content, which is associated with the first content and displayed on the region ensured as the first region is moved, may include an image, a text, a symbol, an icon, a widget, or the combination thereof, which is associated with the first content.

According to another embodiment, the content, which is associated with the second content and displayed on the region ensured as the first region is ensured, may include an image, a text, a symbol, an icon, a widget, or the combination thereof, which is associated with the change in the state of the electronic device or the state of an application executed by the electronic device.

According to another embodiment, the content display region may be divided into the first region, the second region, and a third region disposed opposite to the second region about the first region. In this case, the processor may be configured to, when moving the first region such that the first region covers at least a portion of the second region in response to the specified event, combine the region, which is created as the first region is moved, with the third region and display content, which is associated with the first content or the second content, on the combined region.

According to an embodiment, the method of displaying content may include displaying first content on a first region, displaying, on a second region, a status window to provide an indication representing a state of the electronic device or a state of an application executed by the electronic device, moving the first region in a specified direction, in response to a specified event, and displaying second content, which corresponds to the state, on a third region, based at least on moving the first region.

According to another embodiment, in the method of displaying the content, the aspect ratio of the first region may be maintained before and after moving the first region.

According to another embodiment, the method of displaying the content may further include stopping displaying the status window, when moving the first region such that the first region covers at least a portion of the second region, and re-configuring the second region and the third region such that an occupation area of the second region is included in the area of third region as at least a portion of the area of the third region.

According to another embodiment, the method of displaying the content may further include, when the specified notification is received through the status window, displaying a specified UI object on the first region. The moving of the first region may be performed in response to an input to the specified UI object.

According to another embodiment, in the method of displaying the content, the moving of the first region may be performed in response to a specified notification received through the status window.

According to another embodiment, in the method of displaying the content, the moving of the first region may be performed in response to a touch input having a specified pressure value or more to the first region.

According to an embodiment, a method of displaying content of an electronic device may include displaying first content and second content a first region and a second region, respectively, moving the first region in response to a specified event such that the first region covers at least a portion of the second region, and displaying content associated with the first content or the second content on a region ensured as the first region is moved.

According to another embodiment, in the method of displaying the content, the aspect ratio of the first region may be maintained before and after moving the first region.

According to another embodiment, in the method of displaying content, the region, which is ensured as the first region is moved, may have a size corresponding to a size of the second region.

According to another embodiment, in the method of displaying content, the region, which is ensured as the first region is moved, is disposed opposite to the second region about the first region.

According to another embodiment, in the method of displaying the content, the second content may include a status window to provide an indication representing a state of the electronic device or a state of an application executed by the electronic device, and the specified event may include reception of a specified notification recognized through the status window.

According to another embodiment, the method of displaying the content may further include, when the specified notification is received through the status window, displaying a specified UI object on the first region. The specified event may further include an input to the specified UI object.

According to another embodiment, in the method of displaying the content, the specified event may include a touch input having a specified pressure value or more to the first region.

According to another embodiment, in the method of displaying the content, the content, which is associated with the first content, may include an image, a text, a symbol, an icon, a widget, or the combination thereof, which is associated with the first content.

According to another embodiment, in the method of displaying the content, the content, which is associated with the second region, may include an image, a text, a text, a symbol, an icon, a widget, or the combination thereof, which is associated with the change in the state of the electronic device or the state of an application executed by the electronic device.

According to another embodiment, in the method of displaying the content, the content display region may be divided into the first region, the second region, and a third region disposed opposite to the second region about the first region. In this case, the method of displaying the content may further include combining the region, which is created as the first region is moved, with the third region, when moving the first region such that the first region covers at least a portion of the second region in response to the specified event and displaying content associated with the first content or the second content on the combined region.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a display having a content display region logically divided into a plurality of regions; and
a processor operatively connected with the display,
wherein the processor is configured to:
    display a first content through a first region of the plurality of regions, the first region contacting a second region of the plurality of regions at an upper edge of the first region;
    display a status window through the second region of the plurality of regions, the status window providing an indication representing at least one of a state of the electronic device or a state of an application executed at the electronic device;
    move the first region upward, in response to a specified event, the move causing the first region to cover the second region and reveal a third region from a bottom edge of the first region; and
    display a second content, which corresponds to the indication, on the third region, based on the move of the first region.

2. The electronic device of claim 1, wherein the processor is configured to:
    maintain an aspect ratio of the first region when moving the first region.

3. The electronic device of claim 1, wherein the processor is configured to:
    re-configure the content display region such that an occupation area of the second region is included in an area of the third region as at least a portion of the area of the third region.

4. The electronic device of claim 1, wherein at least a portion of a boundary surrounding the first region is adjacent to at least a portion of a boundary surrounding the second region.

5. The electronic device of claim 1, wherein at least a portion of a boundary surrounding the third region is adjacent to at least a portion of a boundary surrounding the first region.

6. The electronic device of claim 1, wherein an aspect ratio of the third region is set to be different from an aspect ratio of the first region.

7. The electronic device of claim 1,
wherein the display includes a touch panel to receive a touch input, and
wherein the specified event includes a touch input to a specified user interface (UI) object.

8. The electronic device of claim 1,
wherein the display includes:
    a touch panel to receive a touch input; and
    a pressure sensor to detect pressure of the touch input, and
wherein the specified event includes a touch input having a specified pressure value or more to the first region.

9. The electronic device of claim 1, wherein the specified event corresponds to reception of a notification representing change in a state corresponding to the indication.

10. An electronic device comprising:
a display having a content display region logically divided into a first region and a second region; and
a processor operatively connected with the display,
wherein the processor is configured to:
    display a first content on the first region and a second content on the second region contacting the first region at an upper edge of the first region;
    move the first region upward in response to a first event, the move causing the first region to cover a first portion of the second region and reveal a third region from a bottom edge of the first region; and
    display content associated with the first content or the second content on the third region which is created as the first region is moved.

11. The electronic device of claim 10, wherein the processor is configured to maintain an aspect ratio of the first region when moving the first region.

12. The electronic device of claim 10, wherein the third region has a size corresponding to a size of the second region.

13. The electronic device of claim 10, wherein the first region is disposed between the second region and the third region.

14. The electronic device of claim 13,
wherein the processor is configured to:
    move the first region in response to a second event,
    increase the third region when moving the first region in response to the second event such that the first region covers at least a second portion of the second region larger than the first portion of the second region, in response to the second event; and
    display a content associated with the first content or the second content on the increased third region.

15. A method of displaying content of an electronic device, the method comprising:
    displaying a first content on a first region of a plurality of regions, the first region contacting a second region at an upper edge of the first region;
    displaying a status window on the second region for providing an indication representing at least one of a state of the electronic device or a state of an application executed in the electronic device;
    moving the first region upward, in response to a specified event, the move causing the first region to cover the second region and reveal a third region from a bottom edge of the first region; and
    displaying a second content, which corresponds to the indication, on the third region based on the moving of the first region.

* * * * *